US012665282B2

(12) United States Patent
Ishino et al.

(10) Patent No.: US 12,665,282 B2
(45) Date of Patent: *Jun. 23, 2026

(54) WORK VEHICLE

(71) Applicant: Yanmar Holdings Co., Ltd., Osaka (JP)

(72) Inventors: Tatsuya Ishino, Okayama (JP); Yohei Nakagawa, Okayama (JP); Soshi Nomoto, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 159 days.

This patent is subject to a terminal disclaimer.

(21) Appl. No.: 18/218,546

(22) Filed: Jul. 5, 2023

(65) Prior Publication Data

US 2024/0010153 A1     Jan. 11, 2024

(30) Foreign Application Priority Data

Jul. 6, 2022     (JP) ................................. 2022-108859

(51) Int. Cl.
  *H01Q 1/12*      (2006.01)
  *B60R 11/02*     (2006.01)
  *B60R 21/13*     (2006.01)

(52) U.S. Cl.
  CPC ........... *H01Q 1/1207* (2013.01); *B60R 11/02* (2013.01); *B60R 21/131* (2013.01); *B60Y 2200/221* (2013.01)

(58) Field of Classification Search
  CPC ..... H01Q 1/1207; B60R 11/02; B60R 21/131; B60Y 2200/221
  See application file for complete search history.

(56) References Cited

FOREIGN PATENT DOCUMENTS

| EP | 4144590 A1 | | 3/2023 |
|----|------------|---|--------|
| JP | 2019108010 A | * | 7/2019 |
| JP | 2021070335 A | * | 5/2021 |

* cited by examiner

*Primary Examiner* — Henry Luong
(74) *Attorney, Agent, or Firm* — Chris Mizumoto

(57)      ABSTRACT

A work vehicle includes: a vehicle body to which a work machine is connected at a back, a roll-over protection structure frame that, in the vehicle body, is erected in a back part of a drive seat, a positioning unit that, based on a signal sent from a positioning satellite, detects a position of the vehicle body, and a support unit that is fixed to an upper part of the roll-over protection structure frame, and supports the positioning unit from below. The positioning unit has a harness connection part that is connected with a harness for sending information to outside. The harness connection part is positioned in a back part of the positioning unit. The support unit is so positioned as to protrude behind the harness connection part of the positioning unit.

9 Claims, 22 Drawing Sheets

FIG. 1

WORK VEHICLE

CROSS-REFERENCE

This application claims foreign priority of JP2022-108859 filed Jul. 6, 2022, the disclosures of which are hereby incorporated by reference in their entirety.

TECHNICAL FIELD

The present invention relates to a work vehicle such as a tractor.

BACKGROUND ART

Conventionally, there has been proposed a technology that, in a ROPS (roll-over protection structure) frame of a tractor, provides a positioning unit that detects the position of a vehicle body (see, for example, Patent Document 1). The ROPS frame is a guard provided around a drive seat in order to protect, in a tractor free from a ceiling and a pillar to support the ceiling, a driver in the event of an overturn of the tractor, and, in the vehicle body, is erected in an inverted U shape in the back part of the drive seat, for example.

PRIOR ART DOCUMENT

Patent Document

Patent Document 1: Japanese Unexamined Patent Application Publication No. 2019-108003

SUMMARY OF INVENTION

Technical Problem

The information acquired by the positioning unit (for example, position information of tractor) is sent via a harness to a controller. When a connection part (hereinafter referred to as "harness connection part") connected with the harness is provided in the back part of the positioning unit, for example, upping a work machine, which is connected to the back of the vehicle body of the tractor while the positioning unit is fixed to the upper part of the ROPS frame may cause a risk of the harness connection part of the positioning unit coming into contact with the work machine thereby to be damaged.

The present invention has been made to solve the above problem; it is an object of the present invention to provide a work vehicle that can reduce the risk of a harness connection part of a positioning unit coming into contact with the work machine thereby to be damaged.

Solution to Problem

A work vehicle according to an aspect of the present invention includes: a vehicle body to which a work machine is connected at a back; and a roll-over protection structure frame that, in the vehicle body, is erected in a back part of a drive seat, wherein the work vehicle further includes: a positioning unit that, based on a signal sent from a positioning satellite, detects a position of the vehicle body, and a support unit that is fixed to an upper part of the roll-over protection structure frame, and supports the positioning unit from below, and the positioning unit has a harness connection part that is connected with a harness for sending information to outside, the harness connection part is positioned in a back part of the positioning unit, and the support unit is so positioned as to protrude behind the harness connection part of the positioning unit.

Advantageous Effects of Invention

The above configuration can reduce the risk of a harness connection part of a positioning unit coming into contact with a work machine thereby to be damaged.

BRIEF DESCRIPTION OF DRAWINGS

FIG. 1 is a side view schematically showing a configuration of a tractor which is an example of a work vehicle according to an embodiment of the present invention.

DESCRIPTION OF EMBODIMENTS

Figure 2:
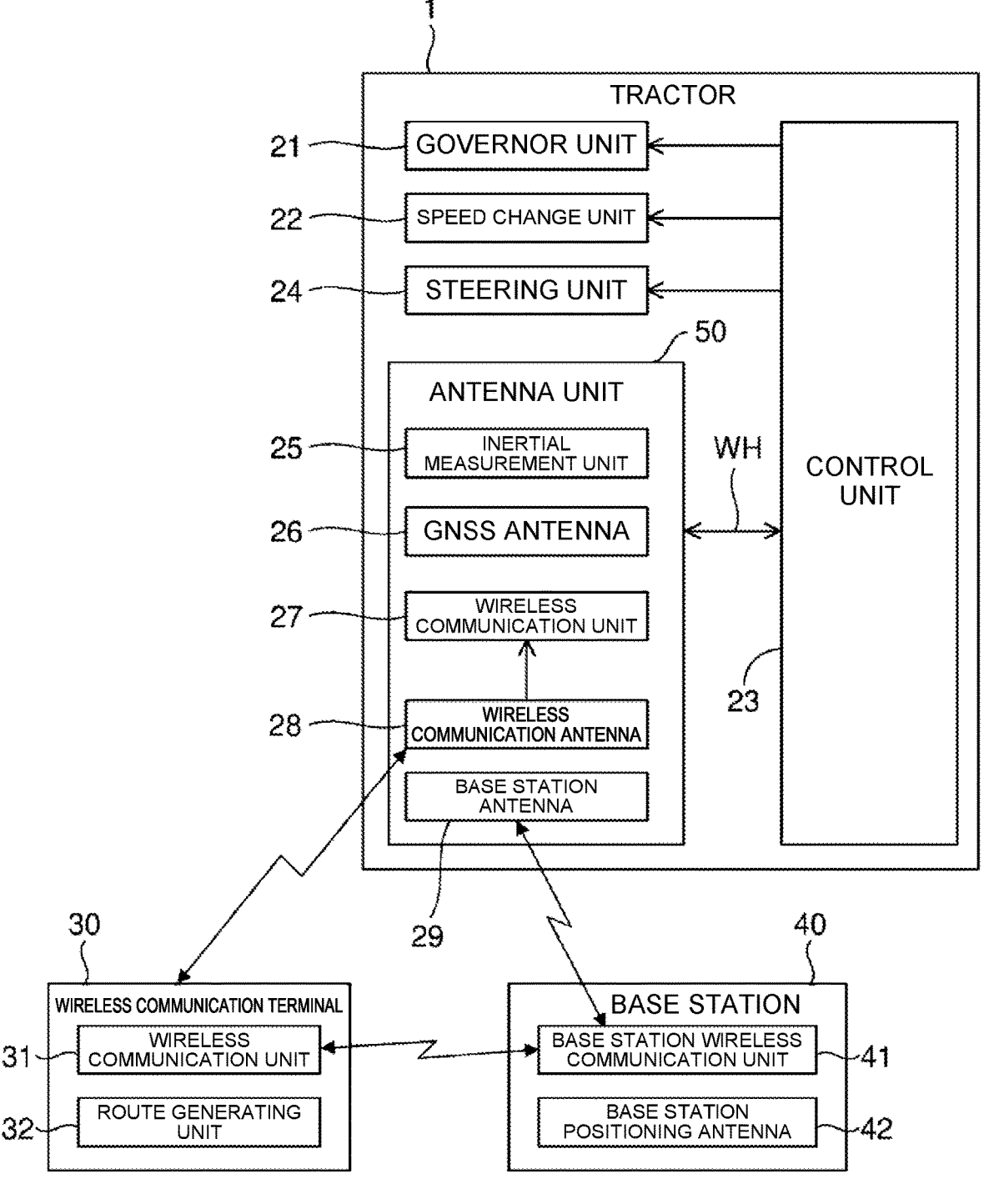
FIG. 2 is a block diagram of a vehicle run system including the tractor.

The following is a description of an embodiment of the present invention based on the drawings. In the present embodiment, a tractor will be described as an example of a work vehicle. Other than the tractor, examples of the work vehicle include riding work vehicles such as a rice planter, a combine harvester, a civil engineering and construction work device, and a snowplow.

Further, in this description, directions are defined as follows. First, the direction in which the tractor as the work vehicle proceeds during work is defined as "front" and the opposite direction is defined as "back". Further, the right side of a proceeding direction of the tractor is defined as "right" and the left side thereof is defined as "left". Further, a direction perpendicular to a front/back direction and a right/left direction of the tractor is defined as an up/down direction. In this case, a gravity direction is set as down, and an opposite side thereof is set as up. In the drawings, the front direction is shown by F, the back direction by B, the left direction by L, the right direction by R, the upward direction by U, and the downward direction by D.

1. Overview of Vehicle Run System

Figure 1:
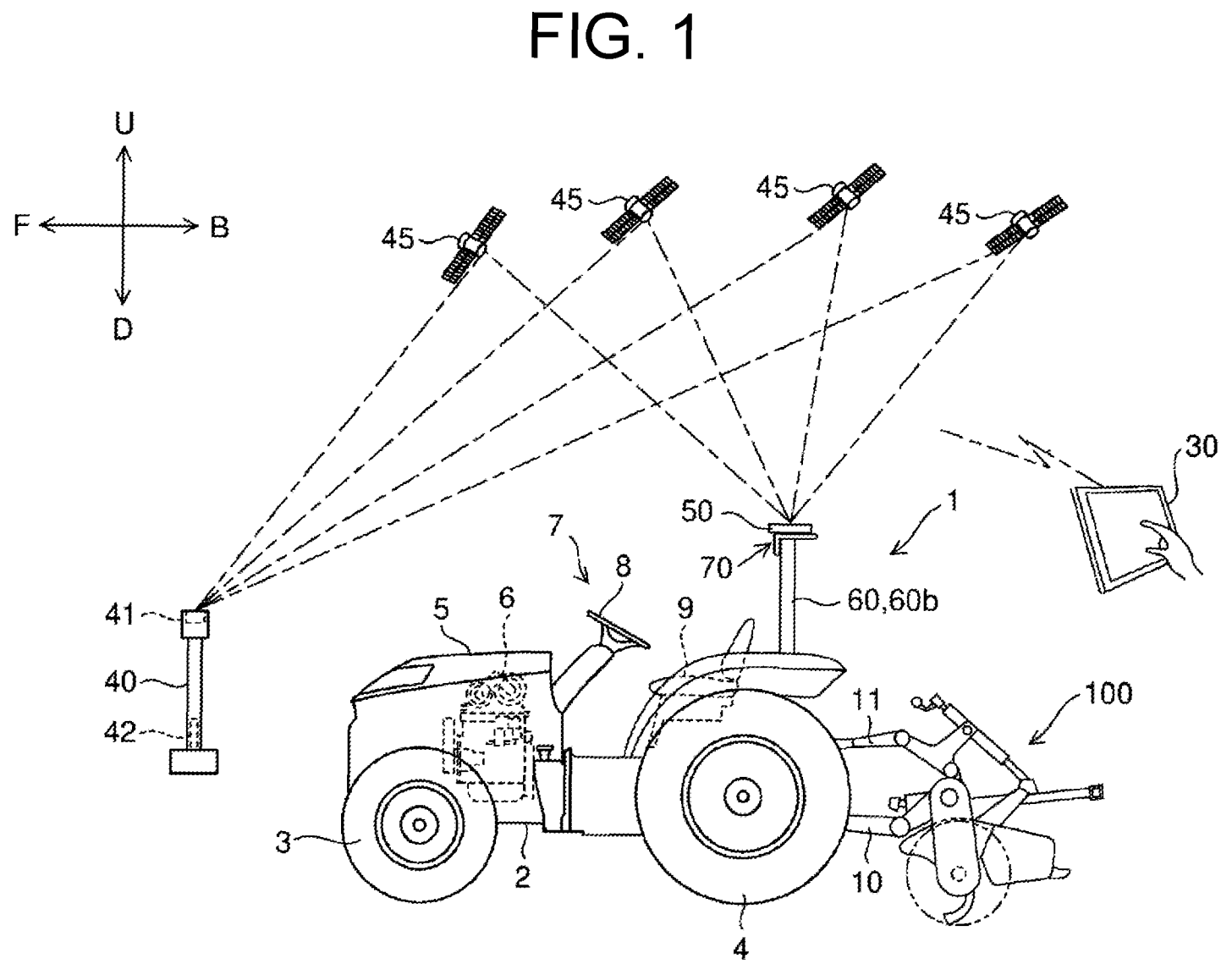

FIG. 1 is a schematic side view of a tractor 1 which is an example of a work vehicle of the present embodiment. FIG. 2 is a block diagram of a vehicle run system including the tractor 1.

As shown in FIG. 2, the vehicle run system is so configured as to have the tractor 1, a wireless communication terminal 30, and a base station 40. The tractor 1 can run according to the operation of a driver, or can autonomously run based on an instruction or the like from the wireless communication terminal 30. The wireless communication terminal 30 is a terminal that gives various instructions and the like to the tractor 1. The base station 40 is so provided so to acquire position information of the tractor 1.

As shown in FIG. 1, the tractor 1 includes a vehicle body 2. At the back of the vehicle body 2, a work machine 100 can be fitted. That is, the tractor 1 is provided with the vehicle body 2 to which work machine 100 is connected at the back. The work machine 100 can be, for example, but is not limited to, a cultivator, a plow, and a fertilizer applicator.

The front part of the vehicle body 2 is supported by a pair of right/left front wheels 3. The back part of the vehicle body 2 is supported by a pair of right/left back wheels 4. A hood 5 is placed in the front part of the vehicle body 2. An engine 6 as a drive source is placed under the hood 5. The engine 6 is a diesel engine, for example; the engine 6, however, is not limited thereto, and may be a gasoline engine, for example. In addition to or instead of the engine 6, an electric motor may be used as the drive source.

In the upper center part in the front/back direction in the vehicle body 2, a drive seat 7 is provided for a human driver (driver). The drive seat 7 is provided with a steering wheel 8 for the driver to make a steering operation, and a driver seat 9 for the driver. Although not shown in the drawing, the drive seat 7 is provided with a control lever, a pedal, etc. operated by the driver.

A three-point link mechanism is provided on the back side of the vehicle body 2. The three-point link mechanism has a pair of right/left lower links 10 and an upper link 11. The work machine 100 is so configured as to be mountable to the three-point link mechanism. Further, an up/down device (not shown) with a hydraulic system such as an up/down cylinder is provided on the back side of the vehicle body 2. The up/down device ups and downs the three-point link mechanism, thereby making it possible to up and down the work machine 100.

In the vehicle body 2, a ROPS frame 60 is provided in the back part of the drive seat 7 (driver seat 9). The ROPS frame 60, as described above, is a safety frame (guard) provided in order to protect the human driver in the event of an overturn of the tractor 1. The ROPS frame 60 includes a hollow frame, and is erected in an inverted U-shape in the back part of the drive seat 7. That is, the tractor 1, in the vehicle body 2, is provided with the ROPS frame 60 that is erected in the back part of the drive seat 7. The height of the ROPS frame 60 can be properly set within the range specified by the regulation.

The ROPS frame 60 is so configured that two longitudinal frames 60b extending in the up/down direction are each connected to one end of the transverse frame 60a (see FIG. 3, etc.) extending in the right/left direction. The connection part between the transverse frame 60a and the longitudinal frame 60b is rounded (curved). This results in the inverted U-shaped ROPS frame 60 described above.

As shown in FIG. 2, the tractor 1 is provided with a governor unit 21 that can govern the revolution speed of the engine 6 and a speed change unit 22 that changes the speed of the rotary drive power from the engine 6 and transmits the rotary drive power to the drive wheel. The governor unit 21 and the speed change unit 22 are controlled by a control unit 23.

The tractor 1 is provided with a steering unit 24. The steering unit 24 is provided, for example, in the middle part of a rotary shaft of the steering wheel 8, and is so configured as to adjust a rotary angle (steering angle) of the steering wheel 8. By the control unit 23 controlling the steering unit 24, the tractor 1 can not only run straight ahead, but also, by adjusting the steering wheel 8's rotary angle to a desired angle, can make a turn at a desired turn radius.

The tractor 1 is further provided with an antenna unit 50. The antenna unit 50 is a positioning unit that, based on a signal sent from a positioning satellite (navigation satellite) 45 shown in FIG. 1, detects the position of the vehicle body 2.

The antenna unit 50 and the control unit 23 are electrically connected by a harness WH. This can send various information or instructions between the antenna unit 50 and the control unit 23 via the harness WH. For example, the vehicle body 2's position information detected by the antenna unit 50 is input to the control unit 23 via the harness WH.

Details of the antenna unit 50 are described below. The antenna unit 50 has an IMU (inertial measurement unit) 25, a GNSS (Global Navigation Satellite System) antenna 26, a wireless communication unit 27, a wireless communication antenna 28, and a base station antenna 29.

The IMU 25 is provided with a 3-axis gyro sensor and a 3-way accelerometer, thereby detecting an angular speed and acceleration in three dimensions. The detected value of the IMU 25 is input to the control unit 23. The control unit 23 can calculate posture information of the tractor 1 based on the detected values. The posture information includes, for example, the azimuth angle of a machine body (yaw angle), the right/left tilt angle of the machine body (roll angle), and the front/back tilt angle in the direction where the machine body is proceeding (pitch angle).

The GNSS antenna 26 receives a radio signal sent from a positioning satellite 45 included in a satellite positioning system (GNSS). As the positioning satellite, in addition to the GPS (Global Positioning System; United States), the Quasi-Zenith Satellite System (Japan), the GLONASS satellite (Global Navigation Satellite System; Russia), or the like can be used in the GNSS.

The wireless communication unit 27 sends and receives various signals via a wireless communication network formed in combination with the wireless communication terminal 30 and the like. In the present embodiment, the wireless communication unit 27 includes a Wifi (registered trademark) unit with a frequency band of 2.4 GHz. The signal sent from the wireless communication terminal 30 is received by the wireless communication antenna 28 and is then input to the control unit 23 via the wireless communication unit 27. Further, the signal from the control unit 23 is sent via the wireless communication unit 27 and the wireless communication antenna 28 to a wireless communication unit 31, etc. of the wireless communication terminal 30.

Here, RTK (Real Time Kinematic) positioning is used in the present embodiment, for example, as a positioning method using the satellite positioning system. In the RTK positioning, the carrier phase (satellite positioning information) from the positioning satellites 45 is measured by both of a base station positioning antenna 42 of the base station 40 placed at a base point, and the tractor 1's GNSS antenna 26 on a mobile station side of a target for which the position information is sought. Each time of measuring the satellite positioning information from the positioning satellite 45 or each time a set period elapses, the base station 40 generates correction information. The correction information is sent from a base station wireless communication unit 41 to the base station antenna 29 of the tractor 1. The control unit 23 of the tractor 1, by using the correction information sent from the base station 40, corrects the satellite positioning information measured by the GNSS antenna 26, thereby to seek the current position information of the tractor 1. The control unit 23 seeks latitude information and longitude information, for example, as the current position information of the tractor 1.

Further, the used positioning method is not limited to the RTK positioning described above, and another positioning method such as DGPS (differential GPS positioning) may also be used. Further, the base station 40 can send and receive various information not only to and from the tractor 1, but also to and from the wireless communication terminal 30.

The wireless communication terminal 30 has, for example, a tablet type personal computer having a touch screen, and the like. The wireless communication terminal 30 is provided with the wireless communication unit 31 and a route generating unit 32 that generates a target run route. The route generating unit 32, based on various types of information input on a touch screen, can generate the target run route for the autonomous run of the tractor 1. The route generating unit 32 has a CPU (Central Processing Unit) possessed by a personal computer, for example.

The wireless communication terminal 30 sends various information to the tractor 1 for autonomous run of the tractor 1, such as the target run route. The control unit 23 of the tractor 1 controls the speed change unit 22, the steering unit 24, etc., based on the tractor 1's current position information sought from the received signal, etc., of the GNSS antenna 26 and based on the vehicle body 2's posture information (displacement information, orientation information) sought from the detected value at the IMU 25. This allows the tractor 1 to autonomously run along the target run route generated by the route generating unit 32.

2. Support Unit

As shown in FIG. 1, the tractor 1 is further provided with a support unit 70. The support unit 70 is fixed to the upper part of the ROPS frame 60, and supports the antenna unit 50 from below. The antenna unit 50 is thus fixed to the upper part of the ROPS frame 60 via the support unit 70.

In the present embodiment, from the viewpoint of reducing the effect of the tractor 1's vibration on the position detection accuracy of the antenna unit 50, the antenna unit 50 is supported by the support unit 70 so that the gravitational center of the antenna unit 50 is positioned in the ROPS frame 60's center in the front/back direction. Further, details of the configuration of the support unit 70 are described below.

Figure 3:
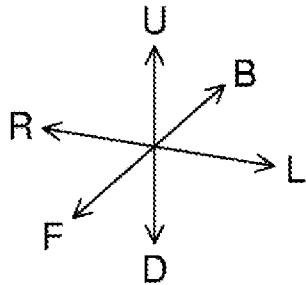
FIG. 3 is a perspective view of an antenna unit and a support unit which are mounted on the tractor, seen from above.
Figure 3:
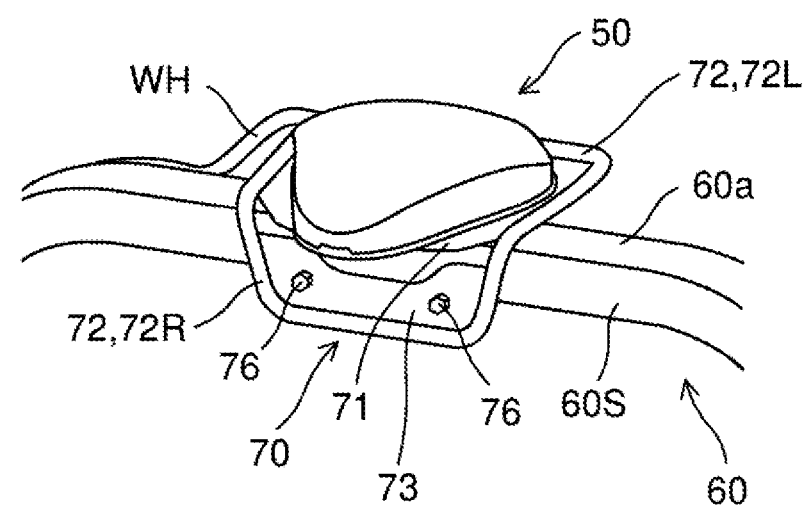
Figure 4:
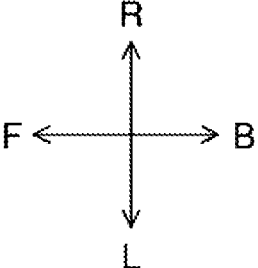
FIG. 4 is a plan view of the support unit.
Figure 4:
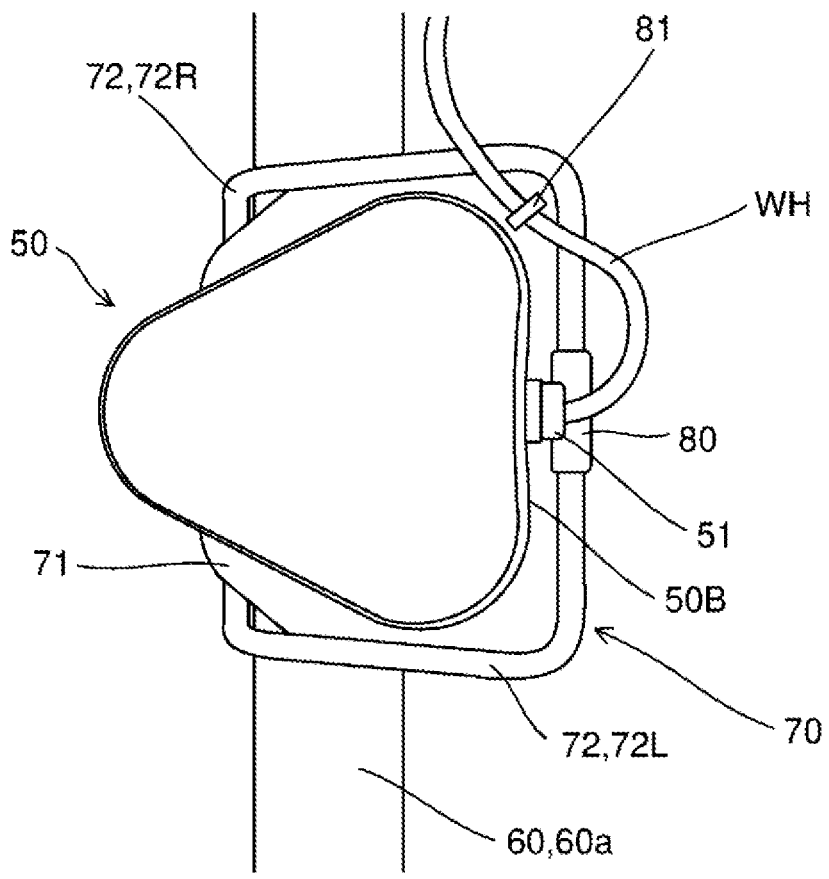
Figure 5:
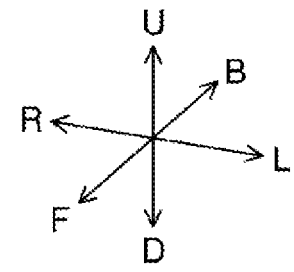
FIG. 5 is a perspective view of the support unit with the antenna unit in FIG. 3 omitted.
Figure 5:
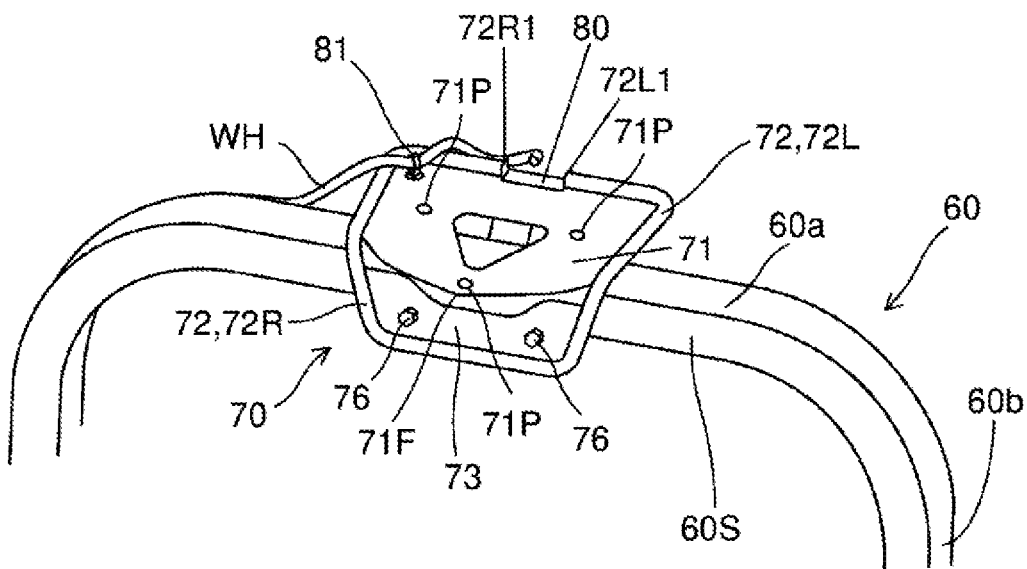

FIG. 3 is a perspective view of the antenna unit 50 and the support unit 70 seen from above, with the antenna unit 50 fixed to the ROPS frame 60 via the support unit 70. FIG. 4 is a plan view of the antenna unit 50 and support unit 70. FIG. 5 is a perspective view of the support unit 70, with the antenna unit 50 in FIG. 3 omitted. In the present embodiment, the support unit 70 functions not only as a support member to support the antenna unit 50, but also functions as a protective member to protect a harness connection part 51 (see FIG. 4) of the antenna unit 50. Herein, the harness connection part 51 is to be first described.

As shown in FIG. 4, the harness connection part 51 of the antenna unit 50 is a connector (coupler) connected to the above harness WH. The terminal on one end side of the harness WH is connected to the harness connection part 51, and the terminal on the other end side is connected to the control unit 23 (see FIG. 2), thereby to make it possible to electrically connect the antenna unit 50 with the control unit 23. Then, various information acquired at the antenna unit 50 (position information, correction information, posture information, etc.) can be sent via the harness WH to the outside (herein, the control unit 23). Thus, the antenna unit 50 has a harness connection part 51 that is connected with the harness WH for sending information to the outside.

The harness connection part 51's position in the antenna unit 50 is not limited, but in the present embodiment, the harness connection part 51 is positioned in the back part of the antenna unit 50. This is due to the following reason.

In a configuration where the harness connection part 51 is provided on the lower face of the antenna unit 50 and the harness WH connected to the harness connection part 51 is caused to pass through the inside of the ROPS frame 60, for example, it is necessary to provide a hole, which is used for the harness WH to pass through, on the upper face of the ROPS frame 60 (the face in contact with the lower face of the antenna unit 50). There is a concern that providing the hole in the ROPS frame 60 may reduce the strength of the ROPS frame 60.

In the configuration where the harness connection part 51 is positioned in the back part of the antenna unit 50, as in the present embodiment, the harness WH connected to the harness connection part 51 can be pulled around outside the ROPS frame 60. Thus, there is no need to provide, in the ROPS frame 60, the hole for the harness WH to pass through. This can prevent the strength of the ROPS frame 60 from being reduced due to drilling of the hole in the ROPS frame 60. Further, since the harness WH can be pulled around behind the ROPS frame 60, the harness WH does not become an obstacle for the driver operating in the drive seat 7 in front of the ROPS frame 60.

As shown in FIG. 4, the support unit 70 is so positioned as to protrude behind the harness connection part 51 of the antenna unit 50. Further, details of the support unit 70 are to be described below, but in the present embodiment, a protective pipe 72, which is a protective member of the support unit 70, has a back end positioned behind the harness connection part 51 (see FIG. 4). From this, it can be said that the support unit 70 having the protective pipe 72 is so positioned as to protrude backward from the harness connection part 51.

With the above positional relation between the antenna unit 50 and the support unit 70; even when the work machine 100 (see FIG. 1) connected to the back of the vehicle body 2 is upped, the support unit 70 (in particular, the protective pipe 72 described below) can prevent the harness connection part 51 of the antenna unit 50, which is fixed to the ROPS frame 60 via the support unit 70, from coming into contact with the work machine 100. This reduces the risk of the harness connection part 51 coming into contact with the work machine 100 thereby to be damaged.

Further, it can be so configured that, at the time of storing the tractor 1 in a barn, for example, the upper part of the ROPS frame 60 can turn backward (bendable) so as to prevent the upper part of the ROPS frame 60 from contacting the upper part of the barn doorway. Even when the antenna unit 50 is fixed via the support unit 70 to the ROPS frame 60 with the above configuration, the support unit 70 can prevent the harness connection part 51 of the antenna unit 50 from coming into contact with the work machine 100 at the time of the upper part of the ROPS frame 60 turning backward. Thus, even when it is so configured that the upper part of the ROPS frame 60 can turn backward, supporting the antenna unit 50 using the support unit 70 of the present embodiment can reduce the risk of the harness connection part 51 coming into contact with the work machine 100 thereby to be damaged.

In particular, the harness connection part 51 is so positioned as to protrude backward from a back face 50B of the antenna unit 50. Further, the back face 50B refers to a backward-facing face in the antenna unit 50.

When the harness connection part 51 is so positioned as to protrude backward from the back face 50B of the antenna unit 50, the harness connection part 51 may be damaged by contact with the outside. Thus, so as to prevent the harness connection part 51 from contacting the work machine 100, the configuration of the present embodiment, in which the support unit 70 is so positioned as to protrude behind the harness connection part 51, is very effective.

Further, as shown in FIG. 4, in a state where the antenna unit 50 is fixed to the ROPS frame 60 via the support unit 70, the harness connection part 51 of the antenna unit 50 is positioned behind the ROPS frame 60. That is, the support unit 70 supports the antenna unit 50 so that the harness connection part 51 is positioned behind the ROPS frame 60.

This configuration ensures that the harness WH, which is connected to the harness connection part 51, can be pulled around behind the ROPS frame 60. Thus, it is possible to reliably so distribute the harness WH as to prevent an obstruction to the driver operating in the drive seat 7 in front of the ROPS frame 60.

Figure 6:
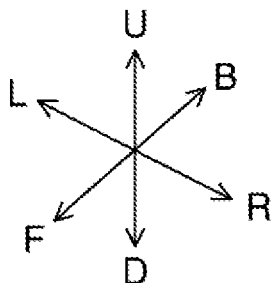
FIG. 6 is a perspective view of the support unit, seen from below.
Figure 6:
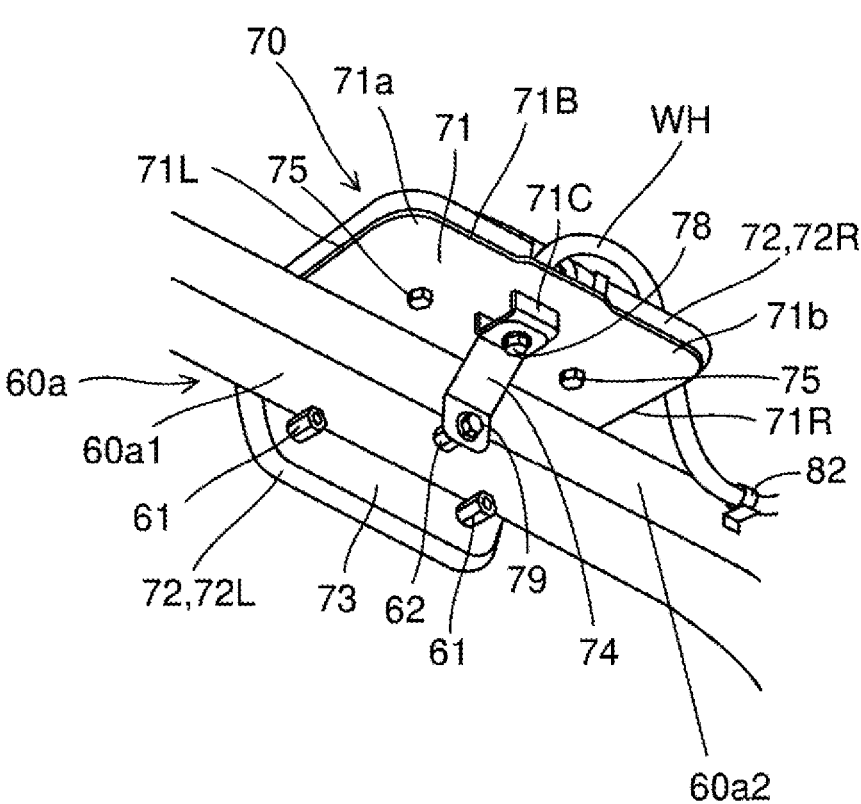
Figure 7:
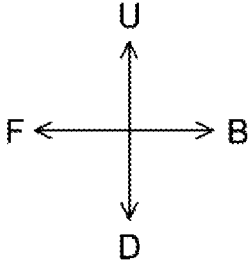
FIG. 7 is a side view of the support unit.
Figure 7:
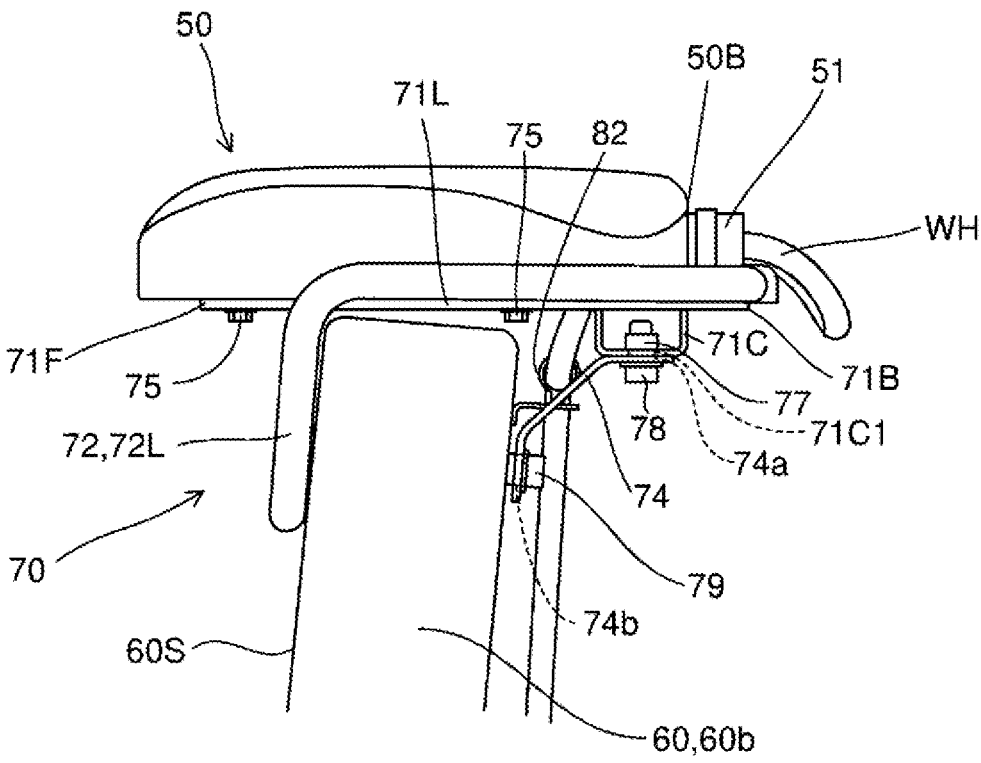

Then, details of the configuration of the support unit 70 described above will be described based on FIGS. 6 and 7, with reference to FIGS. 3 to 5. FIG. 6 is a perspective view of the support unit 70 seen from below. FIG. 7 is a side view of the support unit 70. The support unit 70 has a support plate 71, which is a support member, a protective pipe 72, a fixed plate 73, and a fixing stay 74.

The support plate 71 is a base to which the antenna unit 50 is fixed, and is positioned below the antenna unit 50. In the present embodiment, a through hole 71P (see FIG. 5), which passes through in the up/down direction, is provided at an optional part of the support plate 71. In the present embodiment, there are provided three through holes 71P in the support plate 71, but the number of through holes 71P is not particularly limited. Inserting a first bolt 75 (see FIGS. 6 and 7) into the through hole 71P from the opposite side of the antenna unit 50 and screwing the first bolt 75 with a nut (not shown) provided on the antenna unit 50 side fixes the antenna unit 50 to the support plate 71. That is, the antenna unit 50 is supported by the support plate 71 from below.

Thus, the support unit 70 can be said to have the support plate 71 that supports the antenna unit 50 from below. Further, the above screwing means that the bolt is turned thereby to join with the nut.

As shown in FIGS. 5 and 6, the support plate 71 has a flat plate having an edge. The edges include a front part edge 71F protruding forward, a left edge 71L positioned on the left side and substantially along the front/back direction, a back part edge 71B positioned in the back part and substantially along the right/left direction, and a right edge 71R positioned on the right side and substantially along the front/back direction. As a result, the support plate 71 is pentagonal home plate shaped in plan view. Further, the support plate 71, in plan view, may be any other polygonal shape, such as a square, or any shape other than a polygon (circle, oval, etc.). The support plate 71 is made of metal, such as stainless steel, for example, but may also be made of resin as long as being able to secure strength.

The protective pipe 72 is a hollow metal pipe, and is mounted to part of the edge of the support plate 71. More in detail, the protective pipe 72, by welding or the like, is mounted to the back part edge 71B, the left edge 71L and right edge 71R of the support plate 71. Further, like the support plate 71, the protective pipe 72 may also be made of resin. In this case, an optional method can be selected for fixing the support plate 71 to the protective pipe 72, such as a method using a fixing jig (bolt and nut). Details of the protective pipe 72 are described below.

The fixed plate 73 is positioned along a front face 60S of the ROPS frame 60, and is fixed to the protective pipe 72 by welding or the like. Further, the front face 60S of the ROPS frame 60 refers to a face positioned on the front side (the face turning forward) in the transverse frame 60a and longitudinal frame 60b of the ROPS frame 60.

The fixed plate 73, in the right/left direction, has two through holes (not shown) that pass through in the front/back direction. In the fixed plate 73, the through holes are so formed as to correspond to the positions of two front positioning nuts 61 (see FIG. 6) fixed to the ROPS frame 60. The front positioning nut 61 includes a nut having a long through hole in the front/back direction (so-called high nut), and is welded or otherwise connected to a lower face 60a*l* of the transverse frame 60a of the ROPS frame 60. On the lower face 60a*l* of the transverse frame 60a, the front positioning nut 61 is positioned on the front side of the center in the front/back direction.

Thus, inserting a second bolt 76 (see FIGS. 3 and 5) from the front into the through hole of the fixed plate 73 and screwing the second bolt 76 with the front positioning nut 61 of the ROPS frame 60 can fix the fixed plate 73 to the ROPS frame 60.

The fixing stay 74 is a metal plate used for fixing the support plate 71 to the ROPS frame 60. The fixing stay 74 is formed by bending, at an angle of substantially 45°, both end parts of a single elongated metal plate in a direction that brings the both end parts closer together. In FIG. 7, one end part of the fixing stay 74 has a first through hole 74a that passes through in the up/down direction, and the other end part has a second through hole 74b that passes through in the front/back direction.

Further, a metal fitting 71C, which is U-shaped in side view, is mounted to the lower face of the support plate 71. A through hole 71C1, which passes through in the up/down direction, is formed in the lower face of the U-shaped metal fitting 71C.

Further, as shown in FIG. 6, a back positioning nut 62 is welded or otherwise coupled to the lower face 60a*l* of the transverse frame 60*a* of the ROPS frame 60. The back
positioning nut 62 includes a nut (high nut) having a long
through hole in the front/back direction. On the lower face
60*al* of the transverse frame 60*a*, the back positioning nut 62
is positioned behind the center in the front/back direction
and substantially in the center in the right/left direction.

A nut 77 (see FIG. 7) is positioned in a space enclosed by
the support plate 71's lower face and the U-shaped metal
fitting 71C, and a third bolt 78 is inserted from below into
the first through hole 74*a* of the fixing stay 74 and the
through hole 71C1 of the metal fitting 71C and is screwed
with the nut 77. Further, a fourth bolt 79 is inserted from the
back into the second through hole 74*b* of the fixing stay 74,
and is screwed with the back positioning nut 62 (see FIG. 6)
fixed to the ROPS frame 60. This fixes the support plate 71
via the fixing stay 74 to the ROPS frame 60.

As described above, the second bolt 76 is used thereby to
fix the fixed plate 73 to the ROPS frame 60, and the third
bolt 78 and the fourth bolt 79 are used thereby to fix the
support plate 71 via the fixing stay 74 to the ROPS frame 60,
thereby making it possible to firmly fix the support unit 70
to the ROPS frame 60.

Then, details of the protective pipe 72 are described. The
protective pipe 72 is so configured that a left pipe 72L
positioned to the left of the support plate 71's center in the
right/left direction and a right pipe 72R positioned to the
right of the center are connected in the right/left direction in
front of the ROPS frame 60 and below the support plate 71.
A more detailed description is as follows.

With a start point 72L1 (see FIG. 5) defined as a position
on the left side of the center of the back part edge 71B of the
support plate 71 in the right/left direction, the left pipe 72L
extends to an end part 71*a* (see FIG. 6) as a left back end part
of the support plate 71. Then, the left pipe 72L extends from
the end part 71*a* of the support plate 71 along the left edge
71L to the front of the ROPS frame 60. The left pipe 72L is
disconnected from the left edge 71L on the way extending
from the end part 71*a* of the support plate 71 to the front of
the ROPS frame 60. The left pipe 72L bends downward
along the front face 60S in front of the ROPS frame 60,
extends to a position lower than the transverse frame 60*a* of
the ROPS frame 60, and then is bent rightward and con-
nected with the right pipe 72R.

With the start point 72R1 (see FIG. 5) defined as a
position on the right side of the center of the back part edge
71B of the support plate 71 in the right/left direction, the
right pipe 72R extends to an end part 71*b* (see FIG. 6) as a
right back end part of the support plate 71. Then, the right
pipe 72R extends from the end part 71*b* of the support plate
71 along the right edge 71R to the front of the ROPS frame
60. The right pipe 72R is disconnected from the right edge
71R on the way extending from the end part 71*b* of the
support plate 71 to the front of the ROPS frame 60. The right
pipe 72R bends downward along the front face 60S in front
of the ROPS frame 60, extends to a position lower than the
transverse frame 60*a* of the ROPS frame 60, and then is bent
leftward and connected with the left pipe 72L.

Further, the start point 72L1 of the left pipe 72L and the
start point 72R1 of the right pipe 72R are closed by a closing
plate 80 (see FIG. 4 and FIG. 5). The closing plate 80 is a
flat plate which is U-shaped viewed from the back, and is
fixed to the back part edge 71B of the support plate 71 by
welding or the like. The closing plate 80 is positioned
between the start point 72L1 and the start point 72R1. As a
result, the start point 72L1 and the start point 72R1 are
positioned spaced apart from each other in the right/left
direction.

As described above, the support unit 70 has the protective
pipe 72 that is mounted to part of the edges (back part edge
71B, left edge 71L, and right edge 71R) of the support plate
71. The protective pipe 72 is mounted to the back part of the
support plate 71, specifically to the back part edge 71B, and
extends in the right/left direction.

Mounting the protective pipe 72, which is annular, to part
of the edges of the support plate 71 can reinforce the support
plate 71 and thus the support unit 70. With this, even when
the work machine 100 (see FIG. 1) ups and collides with the
support unit 70, the risk of damage to the support unit 70 can
be securely reduced. Thus, the harness connection part 51
can be reliably protected by the support unit 70.

Further, the protective pipe 72 is has a shape that extends
forward from each of the right and left end parts 71*a*, 71*b* of
the back part edge 71B of the support plate 71 along the right
and left edges 71L, 71R of the support plate 71, and that
connects in front of the ROPS frame 60 and in the right/left
direction in the position below the support plate 71.

In front of the ROPS frame 60 and below the support plate
71, the protective pipe 72 is positioned extending in the
right/left direction. With this, even when the driver boarding
the drive seat 7 in front of the ROPS frame 60 stands up and
the driver's head part contacts the support unit 70, the
possibility of the driver's head part coming into contact with
the protective pipe 72 positioned below the support plate 71
is greater than the possibility of the driver's head part
coming into contact with the support plate 71. The protective
pipe 72 is annular and has a rounded outer peripheral face;
thus, even when the driver's head part should contact the
protective pipe 72, the head part is less likely to be damaged
than when the driver's head part directly contacting the edge
(for example, front part edge 71F (see FIG. 5)) of the support
plate 71. That is, the protective pipe 72 reduces the damage
to the driver's head part and protects the driver's head part.

3. Fixing of Harness

As shown in FIGS. 4 and 5, the tractor 1 of the present
embodiment is provided with a first fixing member 81. The
first fixing member 81 is a member that, to the support unit
70 (in particular, the support plate 71), fixes part of the
harness WH connected to the harness connection part 51 of
the antenna unit 50. The first fixing member 81 includes a
wiring clamp (wire saddle), for example, but may also
include other fixing jigs such as a band and a clip.

The part of the harness WH is fixed to the support unit 70
(in particular, the support plate 71) by the first fixing
member 81, thus making it possible to stabilize the pulling
around (distributing) of the harness WH.

Further, as shown in FIGS. 6 and 7, the tractor 1 of the
present embodiment is further provided with a second fixing
member 82. The second fixing member 82 is a member that
fixes part of the harness WH to the outer surface of the
ROPS frame 60. Conceivable examples of the outer surface
of the ROPS frame 60 include a back face 60*a*2 (see FIG. 6)
of the transverse frame 60*a* of the ROPS frame 60, but the
outer surface can also be the upper face of the transverse
frame 60*a* or the outer surface (side face or back face) of the
longitudinal frame 60*b* (see FIG. 1). Further, the second
fixing member 82 includes a wiring clamp, for example, but
may also include other fixing jigs such as a band and a clip.
Further, the second fixing member 82 may include a metal
fitting that supports the wiring clamp on the outer surface of
the ROPS frame 60.

Using the second fixing member 82 can pull around the
harness WH along the outer surface of the ROPS frame 60.

US 12,665,282 B2

11
12

Thus, compared to the configuration where the harness WH is so pulled around as to pass through the inside of the ROPS frame 60, for example, pulling around of the harness WH is easier. Also, the outer surface of the ROPS frame 60 has no need to form the hole for the harness WH to pass through, as in the configuration where the harness WH is so pulled around as to pass through the inside of the ROPS frame 60. This avoids reduction in strength of the ROPS frame 60. Further, merely unfixing the second fixing member 82 can easily remove the harness WH from the outer surface of the ROPS frame 60, thus making it easier to maintain the harness WH.

4. Other Methods for Mounting Antenna Unit on ROPS Frame

Figure 8:
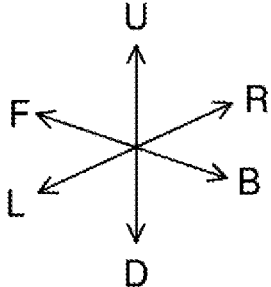
FIG. 8 is a perspective view schematically showing another configuration of the support unit.
Figure 8:
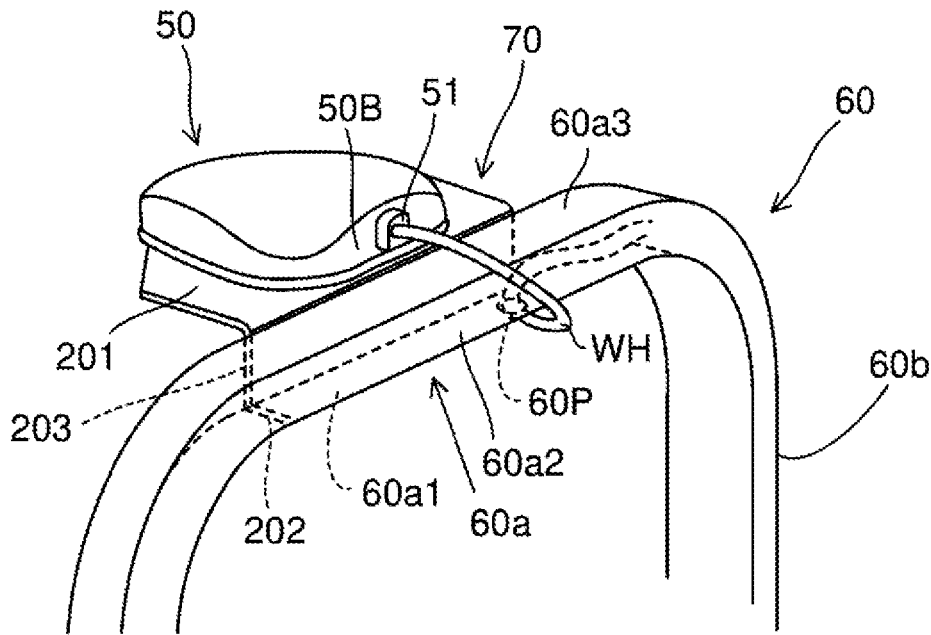

FIG. 8 is a perspective view schematically showing another configuration of the support unit 70. The support unit 70 may be fixed to the ROPS frame 60 in a manner to support the antenna unit 50 in front of the ROPS frame 60. The above support unit 70 is so configured as to have a first flat plate part 201, a second flat plate part 202, and a connection part 203.

The first flat plate part 201 is a flat plate that extends in the front/back and right/left directions, and is positioned in front of the ROPS frame 60. The antenna unit 50 is fixed to the first flat plate part 201 from below by a bolt or the like. The antenna unit 50 is thus supported from below by the first flat plate part 201. The above first flat plate part 201 is positioned at the same height as an upper face 60a3 of the transverse frame 60a of the ROPS frame 60, but may be higher than the upper face 60a3.

The second flat plate part 202 is a flat plate that extends in the right/left direction, and is positioned in contact with the lower face 60al of the transverse frame 60a of the ROPS frame 60. The second flat plate part 202 is fixed to the lower face 60al of the transverse frame 60a by welding or the like, but may also be fixed by a bolt or the like. In the up/down direction, the connection part 203 connects the back end of the first flat plate part 201 with the front end of the second flat plate part 202.

The support unit 70 having the first flat plate part 201, the second flat plate part 202, and the connection part 203 may be formed by bending a single metal plate. Further, the support unit 70 may be formed in a manner to connect, by welding or the like, the first flat plate part 201 with the connection part 203 and the second flat plate part 202 with the connection part 203.

Fixing the antenna unit 50 to the first flat plate part 201, which is positioned in front of the ROPS frame 60, allows the antenna unit 50 itself to be positioned in front of the ROPS frame 60. Thus, even when the work machine 100 (see FIG. 1) is upped, the harness connection part 51 of the antenna unit 50 can be prevented from coming into contact with the work machine 100. As a result, the risk of the harness connection part 51 coming into contact with the work machine 100 thereby to be damaged can be reduced.

Further, when the antenna unit 50 is fixed to the ROPS frame 60, which has the upper part turnable backward, using the support unit 70 shown in FIG. 8; before the turning of the ROPS frame 60, the antenna unit 50 is positioned in front of the ROPS frame 60. Thus, when the upper part of the ROPS frame 60 is turned backward, the ROPS frame 60 is more likely to come into contact with the work machine 100 before the antenna unit 50, and the antenna unit 50 is less likely to come into contact with the work machine 100. Thus, even when the antenna unit 50 is fixed to the ROPS frame 60, which has the upper part turnable backward, using the support unit 70 shown in FIG. 8, the risk of the harness connection part 51 of the antenna unit 50 coming into contact with the work machine 100 thereby to be damaged can be reduced.

Further, as shown in FIG. 8, the lower face 60al of the transverse frame 60a of the ROPS frame 60 may have an insertion hole 60P. Then, the harness WH, which is connected with the harness connection part 51 of the antenna unit 50, may be distributed via the insertion hole 60P through the inside of the ROPS frame 60.

Generally, there is a concern that the strength of the ROPS frame 60 may be reduced when the ROPS frame 60 is configured to be provided with the insertion hole 60P; however, properly selecting the material or the like of the ROPS frame 60 can secure the minimum necessary strength of the ROPS frame 60. Thus, provided that the strength of the ROPS frame 60 should be secured, providing the ROPS frame 60 with the insertion hole 60P and causing the harness WH to pass through the inside of the ROPS frame 60 via the insertion hole 60P can prevent appearance quality deterioration due to the harness WH's exposure to the outside.

Further, since the insertion hole 60P is formed on the lower face 60al of the ROPS frame 60 (transverse frame 60a), rainwater falling from above, water during vehicle washing, mud, etc. are unlikely to penetrate into the inside of the ROPS frame 60 via the insertion hole 60P. Thus, the harness WH's corrosion due to water or the like entering the inside of the ROPS frame 60 can be reduced.

Further, provided that the strength of the ROPS frame 60 should be secured, the insertion hole 60P may be formed on the back face 60a2 of the ROPS frame 60 (for example, transverse frame 60a).

Figure 9:
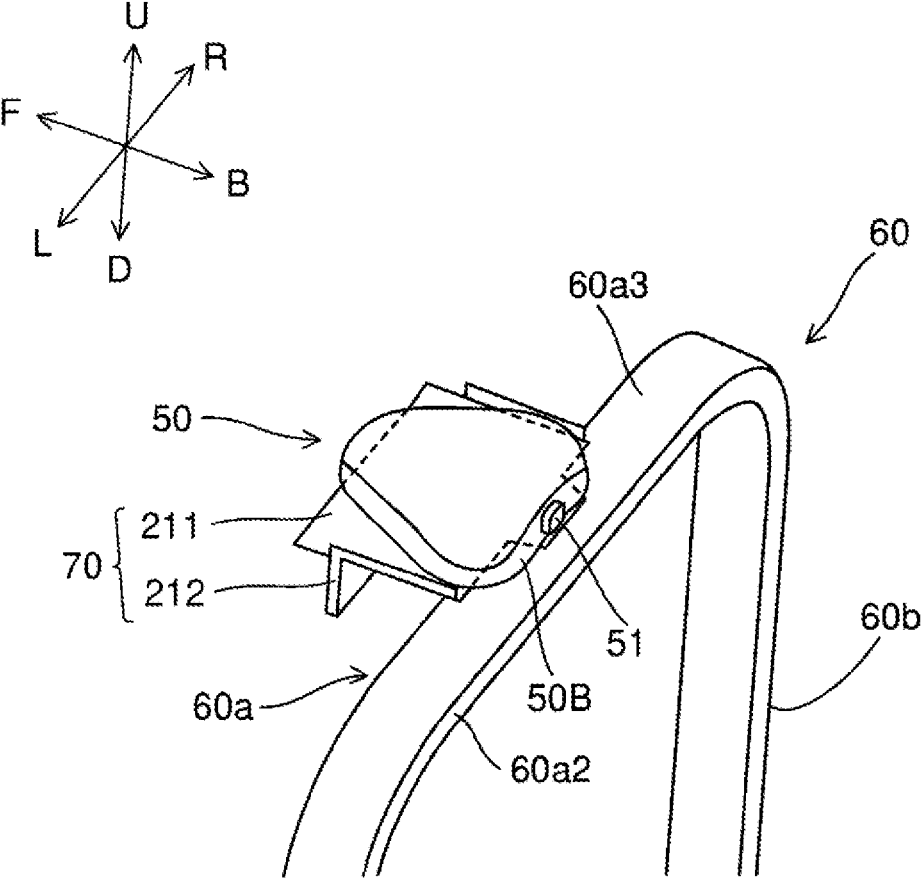
FIG. 9 is a perspective view schematically showing still another configuration of the support unit.
Figure 10:
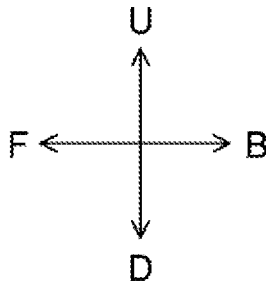
FIG. 10 is a side view of the support unit in FIG. 9.
Figure 10:
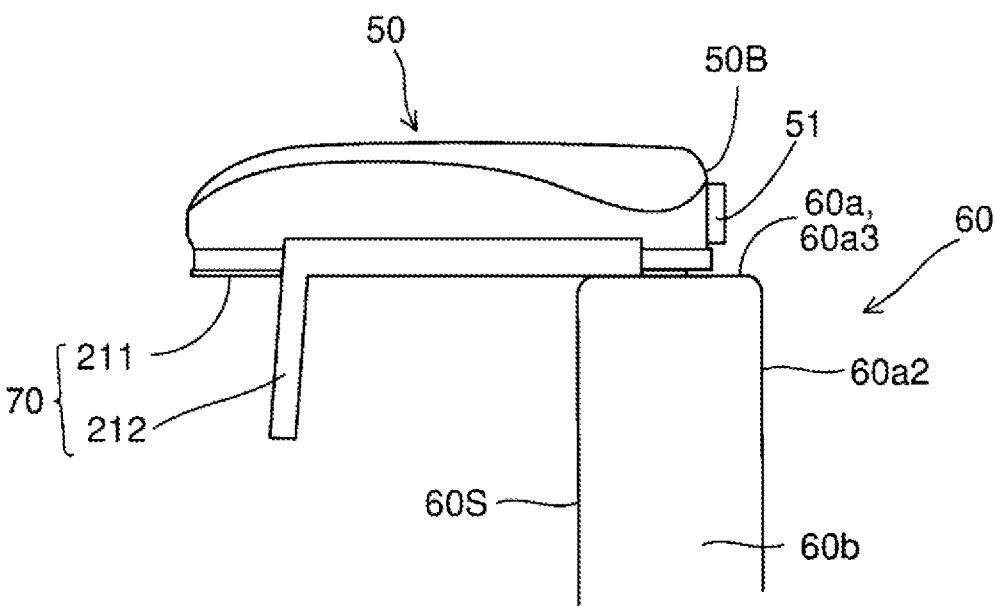

FIG. 9 is a perspective view of still another configuration of the support unit 70. FIG. 10 is a side view of the support unit 70 in FIG. 9. The support unit 70 may be configured to support the antenna unit 50 so that the harness connection part 51 of the antenna unit 50 overlaps the ROPS frame 60 when viewed from above. Here, "the harness connection part 51 of the antenna unit 50 overlaps the ROPS frame 60 when viewed from above" means that all of the harness connection parts 51 overlap the ROPS frame 60 (in particular, the transverse frame 60a) when viewed from above. This means that, when viewed from above, the harness connection part 51 is positioned between the upper part of the front face 60S of the ROPS frame 60 and the upper part of the back face 60a2.

The above support unit 70 is so configured as to have a support base 211 and a fixing stay 212. The antenna unit 50 is fixed, by a bolt or the like, to the support base 211 from below. The antenna unit 50 is thus supported from below by the support base 211. The fixing stay 212 is L-shaped in side view, and is fixed to the support base 211 by welding or the like, thereby to support the support base 211 from below. Also, the fixing stay 212 is fixed, by welding or the like, to the upper face 60a3 of the transverse frame 60a of the ROPS frame 60.

With the support unit 70, the harness connection part 51 of the antenna unit 50 is so positioned as to overlap the ROPS frame 60 viewed from above; thus, even when the work machine 100 (see FIG. 1) is upped, the harness connection part 51 of the antenna unit 50 can be prevented from coming into contact with the work machine 100. As a result, the risk of the harness connection part 51 coming into contact with the work machine 100 thereby to be damaged can be reduced.

Further, even when the support unit 70 in FIG. 9 is applied to the ROPS frame 60 whose upper part is turnable backward, turning the upper part of ROPS frame 60 backward causes the ROPS frame 60 to come into contact with the work machine 100 earlier than the harness connection part 51 of the antenna unit 50. Thus, even when the upper part of the ROPS frame 60 is turned backward, the risk of the harness connection part 51 coming into contact with the work machine 100 thereby to be damaged can be reduced.

Figure 11:
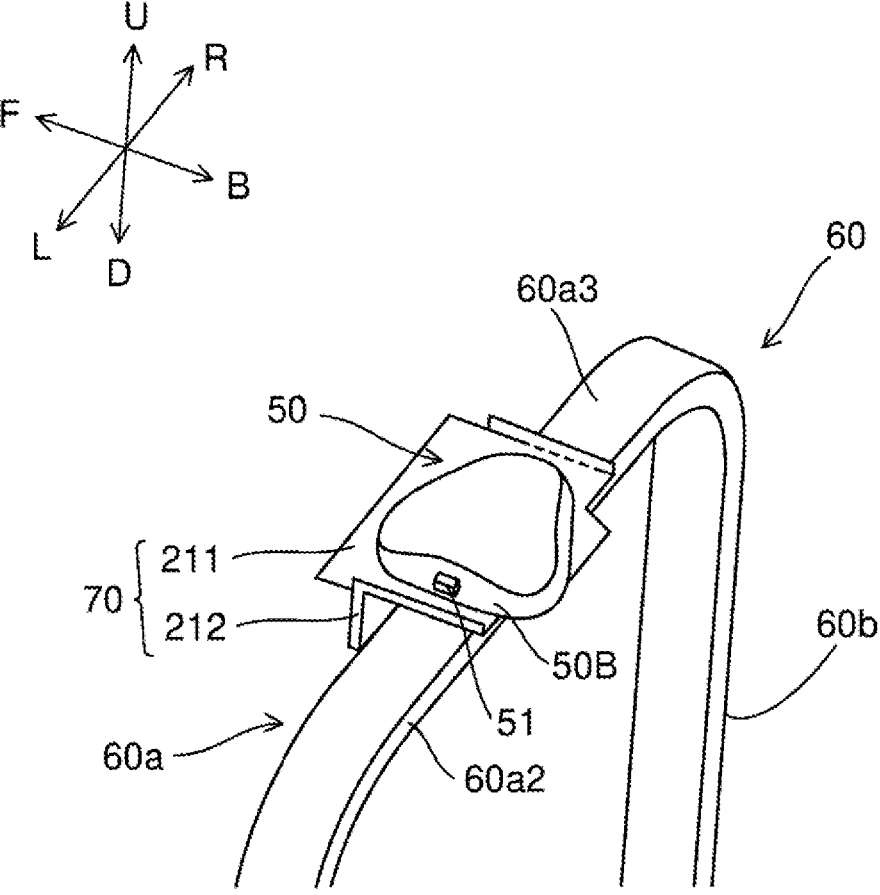
FIG. 11 is a perspective view schematically showing still another configuration of the support unit.
Figure 12:
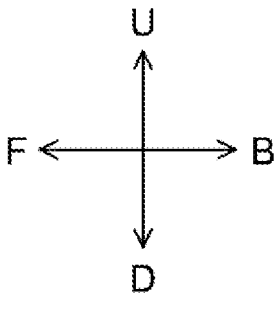
FIG. 12 is a side view of the support unit in FIG. 11.
Figure 12:
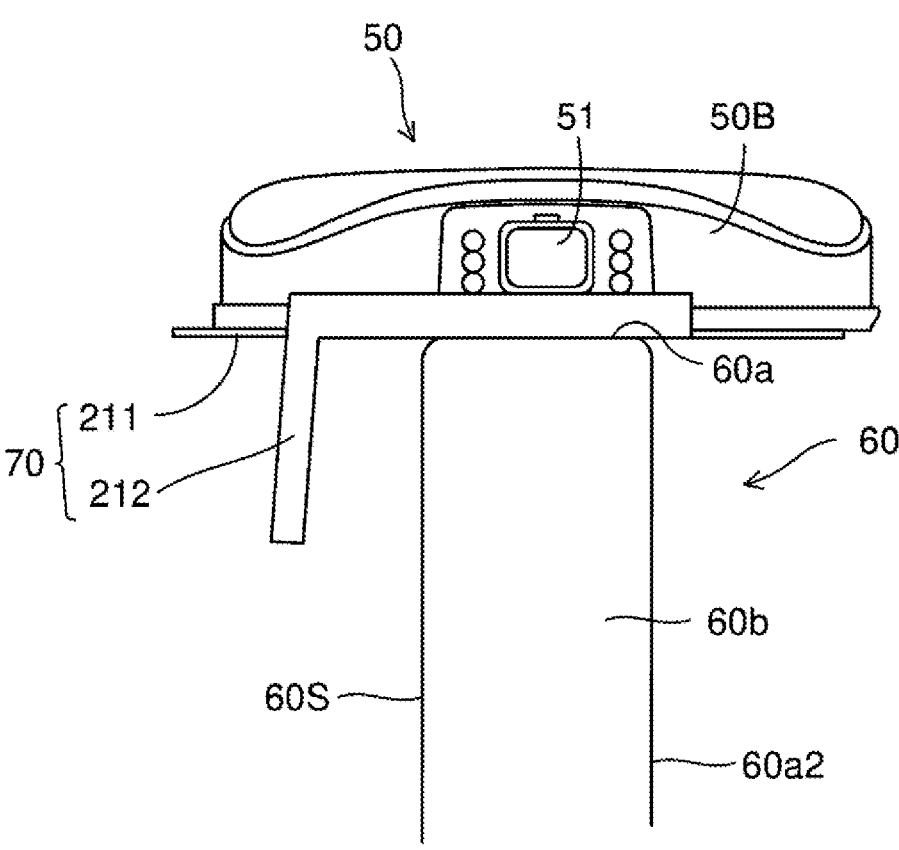

FIG. 11 is a perspective view schematically showing still another configuration of the support unit 70. FIG. 12 is a side view of the support unit 70 in FIG. 11. The support unit 70 is common to FIG. 9 in supporting the antenna unit 50 so that the harness connection part 51 of the antenna unit 50 overlaps the ROPS frame 60, viewed from above. The difference from FIG. 9 is that the support unit 70 supports the antenna unit 50 by 900 turning the antenna unit 50 to the right from the position in FIG. 9. Further, so as to realize the configuration where the support unit 70 supports the antenna unit 50 such that the harness connection part 51 overlaps the ROPS frame 60; as shown in FIGS. 11 and 12, the position of fixing the fixing stay 212 to the ROPS frame 60 by welding or the like is shifted backward from the positions shown in FIGS. 9 and 10.

Further, the support unit 70 may support the antenna unit 50 by 900 turning the antenna unit 50 to the left from the position in FIG. 9. Further, provided that the harness connection part 51 overlaps the ROPS frame 60 when viewed from above, the antenna unit 50's turn angle from the position in FIG. 9 is not limited to 90° described above, but may be any other angle.

Even when the support unit 70 is so configured as to support the antenna unit 50, as shown in FIG. 11, the same effect as in FIG. 9 can be acquired. That is, the harness connection part 51 is so positioned as to overlap the ROPS frame 60 when viewed from above; thus, even when the work machine 100 (see FIG. 1) is upped, the harness connection part 51 of the antenna unit 50 is prevented from coming into contact with the work machine 100, making it possible to reduce the risk of damage to the harness connection part 51. Further, even when the support unit 70 of FIG. 11 is applied to the ROPS frame 60 whose upper part is turnable backward, the risk of the harness connection part 51 coming into contact with the work machine 100 thereby to be damaged can be reduced when the upper part of the ROPS frame 60 turns backward.

Figure 13:
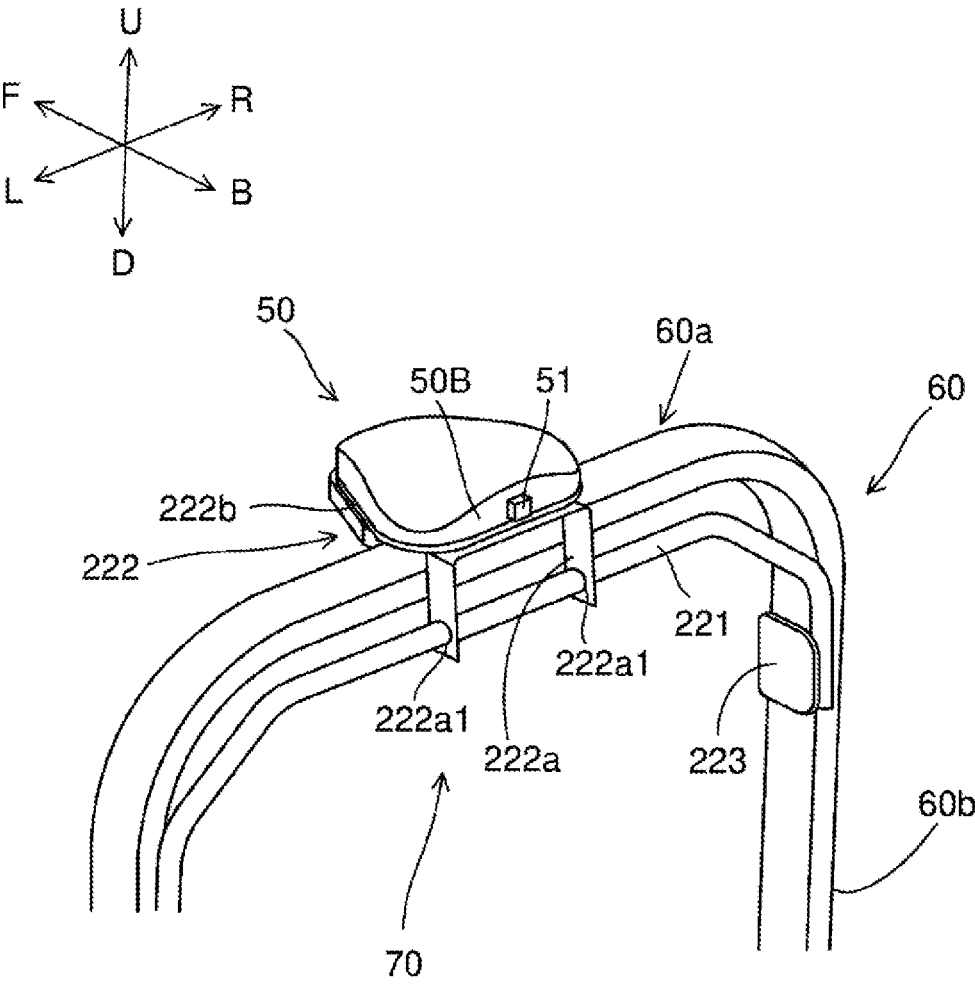
FIG. 13 is a perspective view schematically showing still another configuration of the support unit.

FIG. 13 is a perspective view schematically showing still another configuration of the support unit 70. The support unit 70 may be so configured as to turn the antenna unit 50. The above support unit 70 is so configured as to have a support pipe 221 and a turn plate 222.

The support pipe 221 is so configured as to extend below the transverse frame 60a of the ROPS frame 60 in the right/left direction and to bend downward near the longitudinal frame 60b. Both ends of the support pipe 221 are fixed to the longitudinal frame 60b by a fixing member 223.

The turn plate 222 is so configured as to have a metal plate 222a that is inverted U-shaped viewed from the back, and a support plate 222b connected to the upper part of the metal plate 222a and extending forward. The metal plate 222a is positioned behind the transverse frame 60a of the ROPS frame 60. In the right/left direction, the metal plate 222a has two insertion holes 222al through which the support pipe 221 is inserted. The antenna unit 50 is fixed to the support plate 222b by a bolt or the like. As a result, the antenna unit 50 is supported from below by the support plate 222b.

The support pipe 221 is inserted into the insertion hole 222al of the metal plate 222a of the turn plate 222, thus making it possible for the turn plate 222 to be turnable with the support pipe 221, which extends in the right/left direction, as a rotary shaft. Further, the support pipe 221 itself does not rotate.

Figure 14:
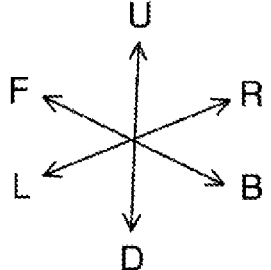
FIG. 14 is a perspective view of the support unit in FIG. 13, showing a state seen after turning a turn plate.
Figure 14:
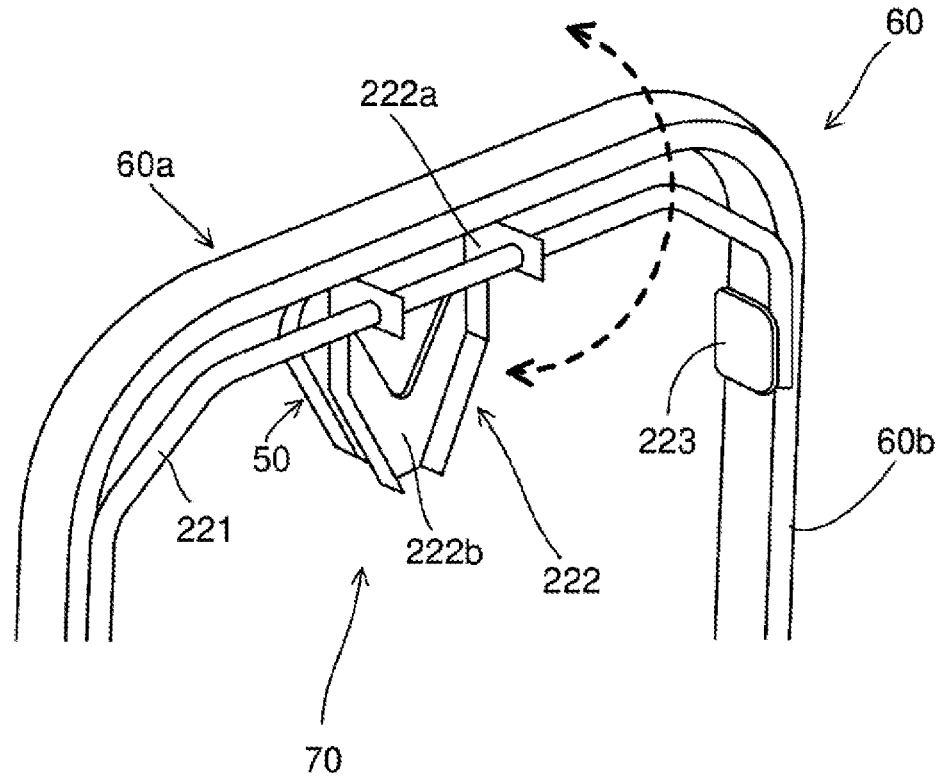

FIG. 14 shows a state seen after turning the turn plate 222. In the state in FIG. 13, the metal plate 222a of the turn plate 222 is positioned behind the transverse frame 60a, thus the turn plate 222 so turns that the antenna unit 50 supported by the support plate 222b passes behind the ROPS frame 60. In this configuration, after the turning of the turn plate 222, the antenna unit 50 supported by the support plate 222b can be positioned in front of the ROPS frame 60. Thus, even when the work machine 100 (see FIG. 1) is upped, the harness connection part 51 of the antenna unit 50 is prevented from coming into contact with the work machine 100, thereby making it possible to reduce the risk of damage to the harness connection part 51.

Further, the turning of the turn plate 222 moves the antenna unit 50 to a lower position (the overall height of the tractor 1 is lowered). At the time of storing the tractor 1 in the barn, this allows the tractor 1 to be stored in the barn without the antenna unit 50 contacting the upper part of the barn entrance. Further, the turn plate 222 so turns that the antenna unit 50 passes behind the ROPS frame 60, thus making it possible to prevent as much as possible the antenna unit 50 from interfering (having a contact) with the driver boarding the drive seat 7 in front of the ROPS frame 60.

Further, the metal plate 222a of the turn plate 222 may be positioned in front of the transverse frame 60a. Then, it may be so configured that the turn plate 222 turns such that the antenna unit 50 passes in front of the ROPS frame 60. Even with this configuration; after the turning of the turn plate 222, the antenna unit 50, which is supported by the support plate 222b, can be positioned in front of the ROPS frame 60. Thus, even when the work machine 100 is upped, the harness connection part 51 of the antenna unit 50 is prevented from contacting the work machine 100, making it possible to reduce the risk of damage to the harness connection part 51.

Figure 15:
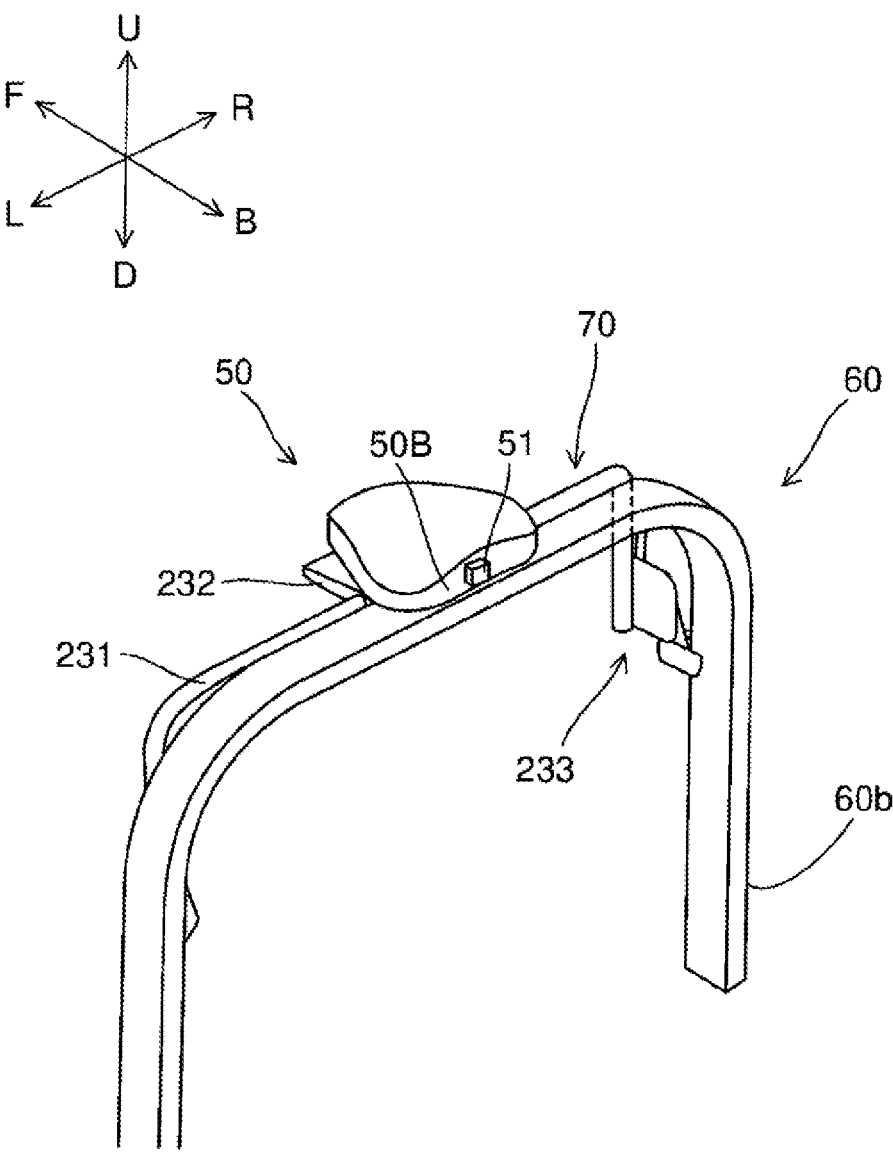
FIG. 15 is a perspective view schematically showing still another configuration of the support unit.

FIG. 15 is a perspective view schematically showing still another configuration of the support unit 70. As shown in FIG. 15, the support unit 70 may be so configured as to turn the antenna unit 50 in combination with the support pipe 231 as a whole. The above support unit 70 is so configured as to have the support pipe 231, a turn plate 232, and a hinge part 233.

The support pipe 231 is so configured as to extend in front of the transverse frame 60a of the ROPS frame 60 in the right/left direction, and to be bent downward near the longitudinal frame 60b. Both ends of the support pipe 231 are fixed to the longitudinal frame 60b via the hinge part 233.

The turn plate 232 is fixed to the support pipe 231 by welding or the like. The antenna unit 50 is fixed to the turn plate 232 by a bolt or the like. The antenna unit 50 is thus supported from below by the turn plate 232.

The hinge part 233 is a turn mechanism by which the support pipe 231 is rotatably connected to the ROPS frame 60 (in particular, longitudinal frame 60b). The hinge part 233 allows the support pipe 231 to turn relative to the ROPS frame 60, with the right/left direction as a rotary axis.

Figure 16:
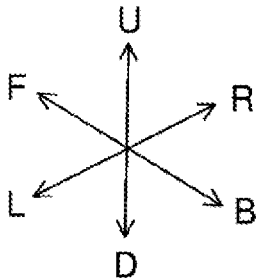
FIG. 16 is a perspective view of the support unit in FIG. 15, showing a state seen after turning the turn plate and a support pipe.
Figure 16:
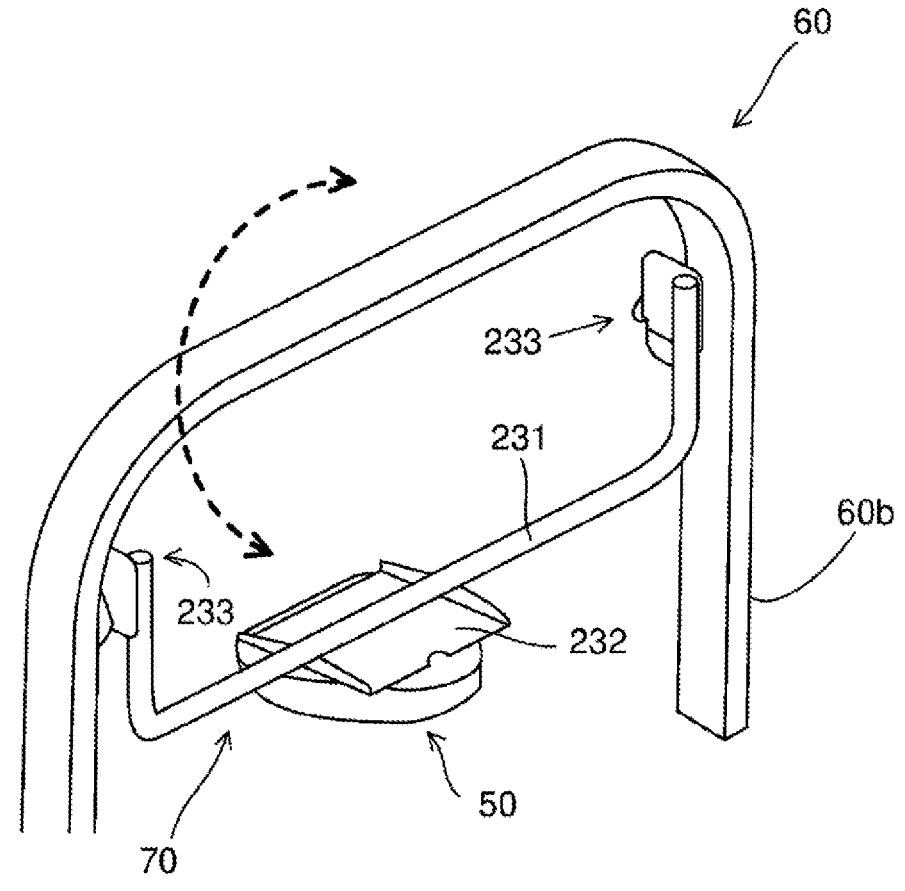

FIG. 16 shows a state seen after the support pipe 231 is turned together with the turn plate 232. In the state shown in FIG. 15; since the support pipe 231 is positioned in front of the transverse frame 60a of the ROPS frame 60, the turn
plate 232 is turned together with the support pipe 231 so that
the antenna unit 50 supported by the turn plate 232 passes in
front of the ROPS frame 60. In this configuration, after the
turning of the turn plate 232, the harness connection part 51
(see FIG. 15) of the antenna unit 50 supported by the turn
plate 232 can be positioned in front of the ROPS frame 60.
Thus, even when the work machine 100 (see FIG. 1) is
upped, the harness connection part 51 is prevented from
coming into contact with the work machine 100, making it
possible to reduce the risk of damage to the harness con-
nection part 51.

Further, the antenna unit 50 moves to a lower position due
to the turning of the turn plate 232; thus, at the time of
storing the tractor 1 in the barn, the tractor 1 can be stored
in the barn without the antenna unit 50 coming in contact
with the upper part of the barn entrance. Further, the hinge
part 233 allows the support pipe 231 to turn together with the
turn plate 232 and to move to the lower position; thus, after
the turning, the backward view from the driver boarding the
drive seat 7 can be widely secured (the backward view is not
obstructed by the support pipe 231). This makes it easier for
the driver to visually check the back.

Further, the support pipe 231 may be positioned behind
the transverse frame 60a. Then, it may be so configured that
the turn plate 232 turns together with the support pipe 231
such that the antenna unit 50 passes behind the ROPS frame
60. Even with this configuration, after the turning of the turn
plate 232, the harness connection part 51 of the antenna unit
50 supported by the turn plate 232 can be positioned in front
of the ROPS frame 60. Thus, even when the work machine
100 is upped, the harness connection part 51 is prevented
from contacting the work machine 100, making it possible
to reduce the risk of damage to the harness connection part
51.

5. Modified Example of Support Unit (5-1. About Notch Part)

Figure 17:
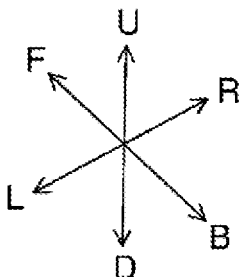
FIG. 17 is a perspective view of the configuration of a modified example of the support unit shown in FIGS. 3 to 7, showing the antenna unit in a state of being supported.
Figure 17:
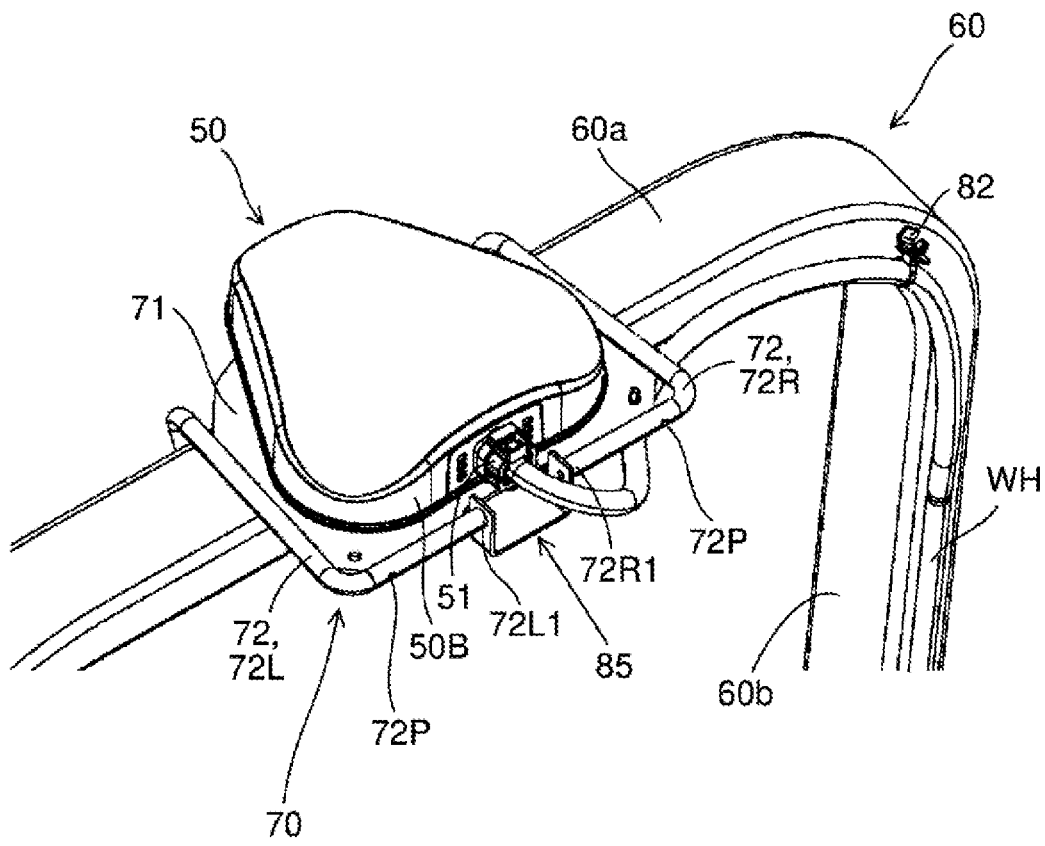
Figure 18:
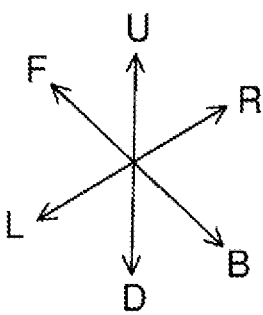
FIG. 18 is a perspective view of the support unit's support plate and the antenna unit which are of the modified example.
Figure 18:
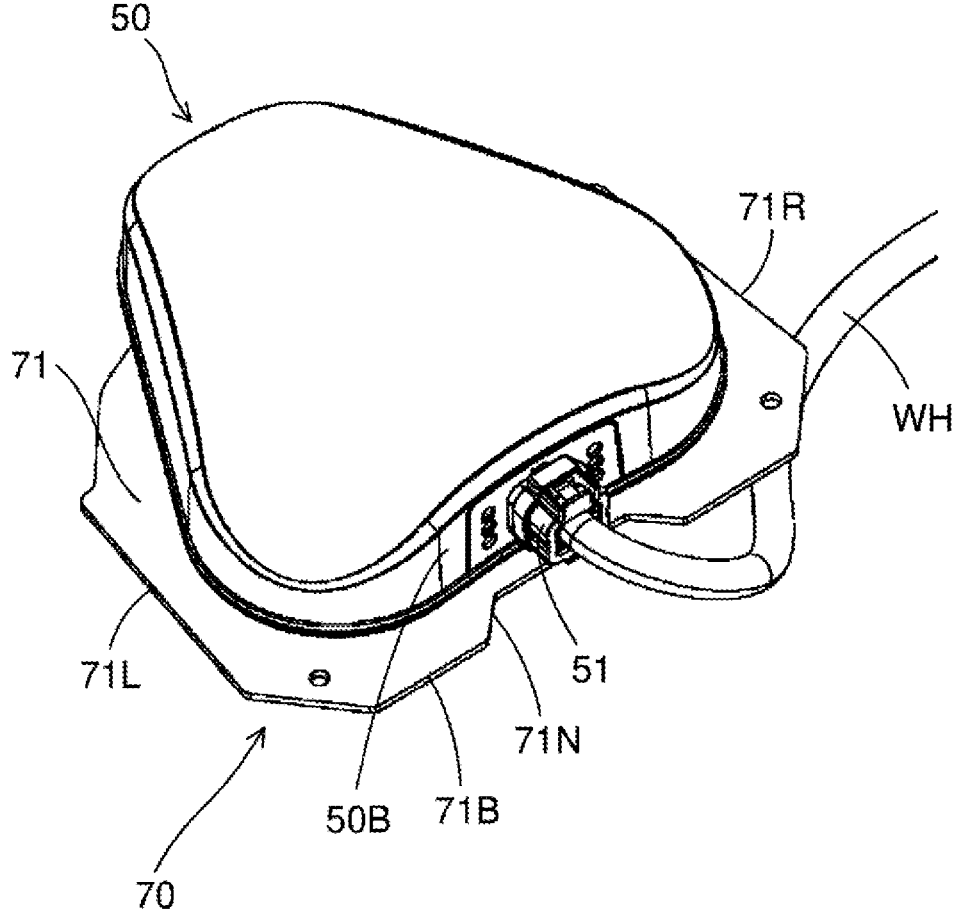
Figure 19:
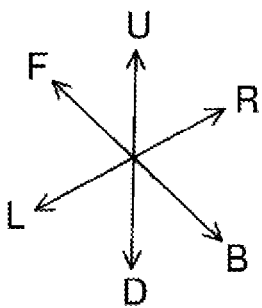
FIG. 19 is a side view of the support unit.
Figure 19:
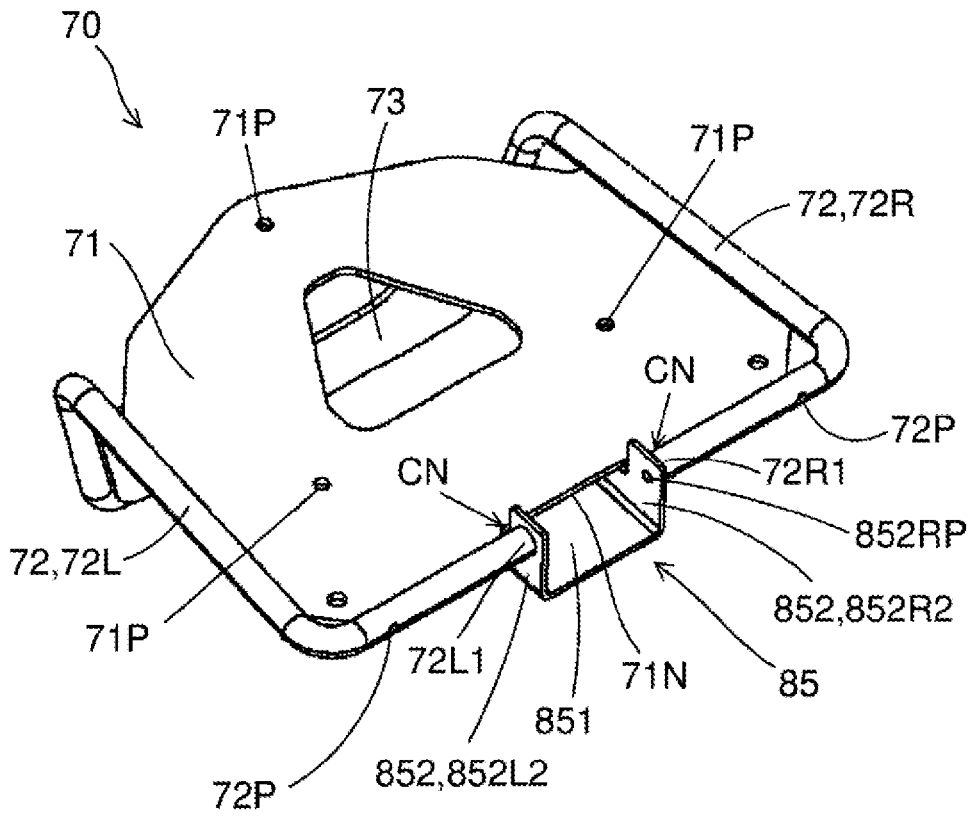

FIG. 17 is a perspective view of a modified example of the
support unit 70 shown in FIGS. 3 to 7, with the antenna unit
50 supported. FIG. 18 shows a perspective view of the
support unit 70's support plate 71 and the antenna unit 50 in
FIG. 17. FIG. 19 is a side view of the support unit 70 in FIG.
17. In the support unit 70 of the modified example, the
support plate 71 supporting the antenna unit 50 has a notch
part 71N, as shown in FIG. 18. The notch part 71N is
configured as to have a notch in the center part of the back
end of the support plate 71 in the right/left direction. That is,
the support plate 71 has a shape in which the center part of
the back part edge 71B in the right/left direction is concave
forward.

In FIG. 18, the notch part 71N is formed in a concave
shape toward the front with only straight part connected, but
the shape of the notch part 71N is not limited to the shape
shown in FIG. 18. For example, the notch part 71N may
include a curved part that is concave toward the front.
Further, the notch part 71N, by connecting the straight part
with the curved part, may be formed in a concave shape
toward the front.

As shown in FIG. 18, the antenna unit 50 is supported
from below by the support plate 71. At this time, the back
face 50B of the antenna unit 50 is positioned in front of the
notch part 71N. Further, the harness connection part 51 of
the antenna unit 50 is so positioned as to protrude backward
from the back face 50B of the antenna unit 50, as in the
configuration in FIG. 3 and the like. In the state where the antenna unit 50 is supported by the support plate 71 in the
above manner, the notch part 71N of the support plate 71 is
positioned below the harness connection part 51 of the
antenna unit 50. That is, the support plate 71 has the notch
part 71N positioned below the harness connection part 51.

In this configuration, the space below the harness con-
nection part 51 is expanded in the up/down direction,
compared to the configuration in which the notch part 71N
is not present below the harness connection part 51 (see FIG.
4, for example). This makes it easier to insert the harness
WH's terminal into the harness connection part 51 (improv-
ing assemblability).

(5-2. About Mount Stay)

Figure 20:
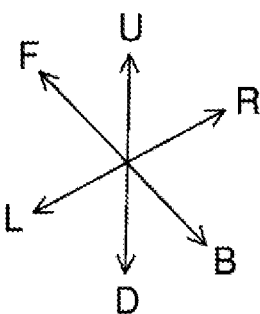
FIG. 20 is a perspective view of a mount stay possessed by the support unit.
Figure 20:
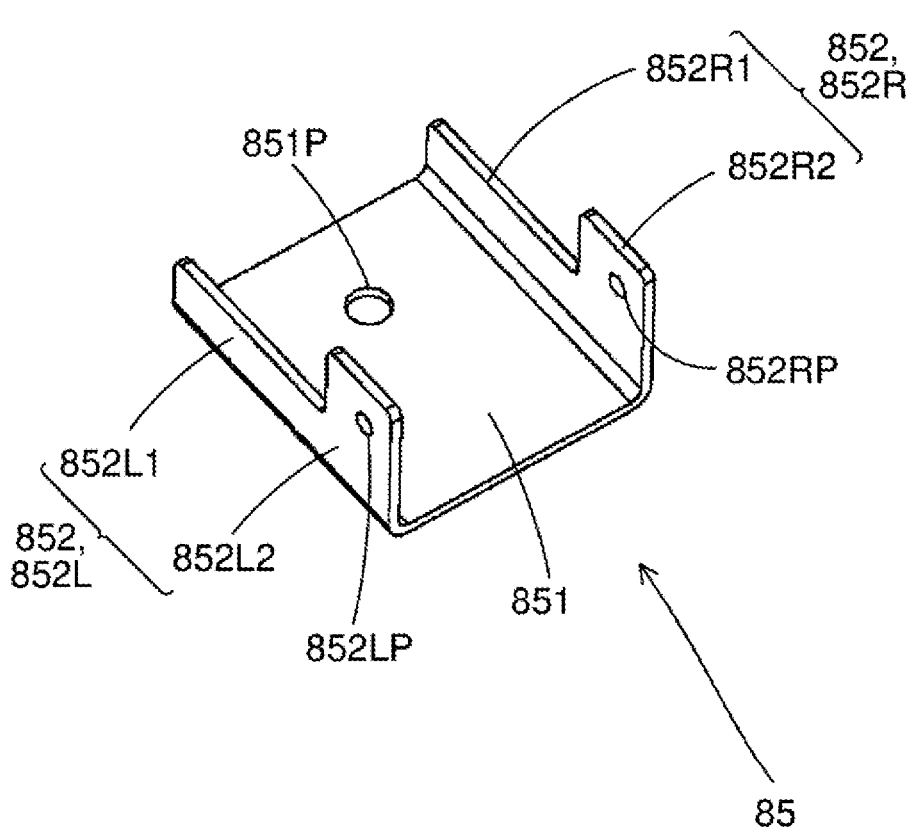

In the support unit 70 of the modified example, a mount
stay 85 shown in FIGS. 17 and 19 is provided instead of the
closing plate 80 shown in FIGS. 4, etc. Details of the mount
stay 85 are to be described below based on FIG. 19 and FIG.
20. FIG. 20 is a perspective view of the mount stay 85.

The mount stay 85 is a metal mount stay that is welded to
support plate 71 and the protective pipe 72. That is, the
support unit 70 has the mount stay 85 as a mount stay that
is fixed to (at least) the support plate 71. The mount stay 85
has a shape (concave, U-shaped) that is depressed downward
through the inside (space in) the above notch part 71N of the
support plate 71.

Specifically, as shown in FIG. 20, the mount stay 85 has
a bottom plate part 851 and a sidewall part 852. The sidewall
part 852 includes a left sidewall part 852L and a right
sidewall part 852R. The left sidewall part 852L is connected
to the left end part of the bottom plate part 851, and extends
upward. The right sidewall part 852R is connected to the
right end part of the bottom plate part 851 and extends
upward. Thus, the left sidewall part 852L and the right
sidewall part 852R are connected to the respective right and
left end parts of the bottom plate part 851, thereby to form
the mount stay 85 that is a concave shape depressed down-
ward when viewed from the back.

In the bottom plate part 851, an open part 851P is formed
in front of the center of the bottom plate part 851 in the
front/back direction. The open part 851P is a hole into which
a third bolt 78 (see FIG. 21) is inserted. Further, the open
part 851P is a hole that corresponds to the through hole 71C1
of the metal fitting 71C shown in FIGS. 6 and 7.

The left sidewall part 852L includes a left front wall part
852L1 and a left back wall part 852L2. The upper end edge
of the left front wall section 852L1 is connected to the lower
face of the support plate 71 by welding. The left back wall
part 852L2 is positioned behind the left front wall part
852L1, and is formed integrally with the left front wall part
852L1. The left back wall part 852L2 is higher (longer in the
up/down direction) than the left front wall part 852L1. The
left back wall section 852L2 is connected by welding to the
end part (start point 72L1) of the left pipe 72L included in
the protective pipe 72, as shown in FIG. 19.

The right sidewall part 852R includes a right front wall
part 852R1 and a right back wall part 852R2. The upper end
edge of the right front wall section 852R1 is connected to the
lower face of the support plate 71 by welding. The right back
wall part 852R2 is positioned behind the right front wall part
852R1, and is integrally formed with the right front wall part
852R1. The right back wall part 852R2 is higher (longer in
the up/down direction) than the right front wall part 852R1.
The right back wall part 852R2 is connected by welding to
the end part (start point 72R1) of the right pipe 72R included
in the protective pipe 72, as shown in FIG. 19.

The support unit 70 has the mount stay 85 that is
depressed downward through the inside of the notch part 71N, thereby allowing the harness connection part 51 to be guarded (protected) from below by the mount stay 85 while ensuring, below the harness connection part 51, a space that extends in the up/down direction. From the viewpoint of both securing the space thereby to improve assemblability and strengthening the protection of the harness connection part 51, it is desirable for the support unit 70 to have the above mount stay 85.

Further, when, for example, the end parts (for example, start points 72L1 and 72R1) of the protective pipe 72 are exposed, the harness WH, when contacting the above end parts, may be damaged. Further, the worker, when coming in contact with the above end parts, may be injured. Further, a decrease in appearance quality may be caused.

In the configuration of the support unit 70 in the modified example, the mount stays 85 (for example, left sidewall part 852L, right sidewall part 852R) and the end parts (for example, start points 72L1, 72R1) of the protective pipe 72 are connected by welding. This prevents the above end parts from being exposed, thus reducing the occurrence of the above inconvenience due to contact with the above end parts.

(5-3. About Fastening Part)

Figure 21:
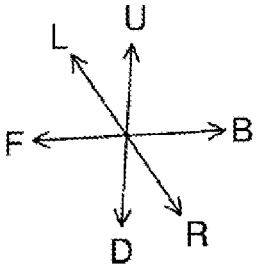
FIG. 21 is a perspective view of the support unit, seen from the opposite side of the antenna unit.
Figure 21:
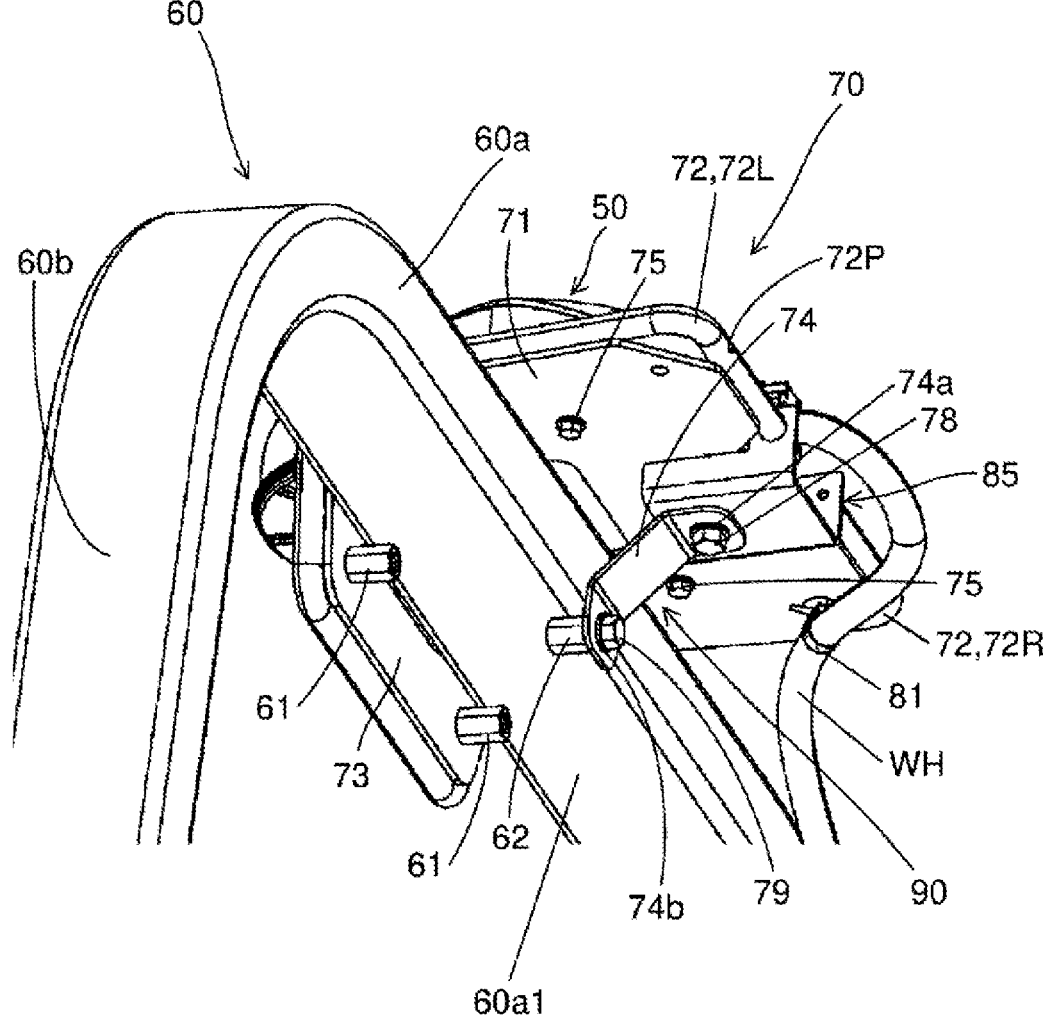

FIG. 21 is a perspective view of the support unit 70 of the modified example, viewed from the opposite side of the antenna unit 50. The support unit 70 has a fastening part 90. The fastening part 90 is a mechanism that fastens the mount stay 85 to the ROPS frame 60, and has the fixing stay 74 similar to that in FIG. 6.

On the upper face of the bottom plate part 851 of the mount stay 85, a nut (not shown) is placed in the position of the open part 851P (see FIG. 20), the third bolt 78 is inserted from below into the fixing stay 74's first through hole 74a and the open part 851P, to be screwed with the nut. Further, a fourth bolt 79 is inserted from the back into the second through hole 74b of the fixing stay 74, to be screwed with the back positioning nut 62 fixed to the ROPS frame 60. This fixes the mount stay 85 via the fixing stay 74 to the ROPS frame 60. In other words, the support plate 71 to which the mount stay 85 is welded is fixed via the fastening part 90 to the ROPS frame 60.

Meanwhile, the fixing the fixed plate 73 of the support unit 70 to the ROPS frame 60 is similar to the configuration shown in FIG. 3 and the like. Thus, inserting the second bolt 76 (see FIG. 3) from the front into the through hole (not shown) of the fixed plate 73 and screwing the second bolt 76 with the front positioning nut 61 of the ROPS frame 60 fixes the fixed plate 73 to the ROPS frame 60. That is, the fixed plate 73, which is connected via the protective pipe 72 with the support plate 71, is fixed to the ROPS frame 60. In this way, the support unit 70 is fixed to the ROPS frame 60 on the front and back sides, respectively; thus, the fixing of the support unit 70 to the ROPS frame 60 becomes stronger, stabilizing the antenna unit 50's being supported by the support unit 70 on the ROPS frame 60.

In the configuration where the support unit 70 has the mount stay 85 which is concave-shaped, the bottom plate part 851 of the mount stay 85, which is provided to secure the space below the harness connection part 51, can be effectively used as a foundation for fixing the fixing stay 74.

Thus, there is no need to separately provide a dedicated part (for example, metal fitting 71C) that fixes the fixing stay 74, as shown in FIG. 6, etc.

(5-4. About Hole Part)

In the support unit 70 of the modified example, the protective pipe 72, which is a hollow pipe, has a hole part. Specifically, as shown in FIGS. 17, 19, and 21, the protective pipe 72 has a side face hole part 72P. Making the protective pipe 72 into a lightweight hollow pipe makes it possible to reduce the weight effect on the vehicle body and to improve assemblability.

Further, the mount stay 85 has a hole part in a connection part CN connected with the protective pipe 72. Here, the connection part CN refers to a connection part between the mount stay 85's left back wall part 852L2 of and the left pipe 72L, and a connection part between the right back wall part 852R2 and the right pipe 72R. As shown in FIG. 20, the left back wall part 852L2 of the mount stay 85 is provided, as the hole part, with a left sidewall hole part 852LP that is connected with the interior of the left pipe 72L. Further, the right back wall part 852R2 of the mount stay 85 is provided, as the hole part, with a right sidewall hole part 852RP that is connected with the interior of the right pipe 72R.

Further, in the support unit 70, it is sufficient that at least one of the side face hole part 72P and the connection part CN's hole part (left sidewall hole part 852LP, right sidewall hole part 852RP) should be provided.

Figure 22:
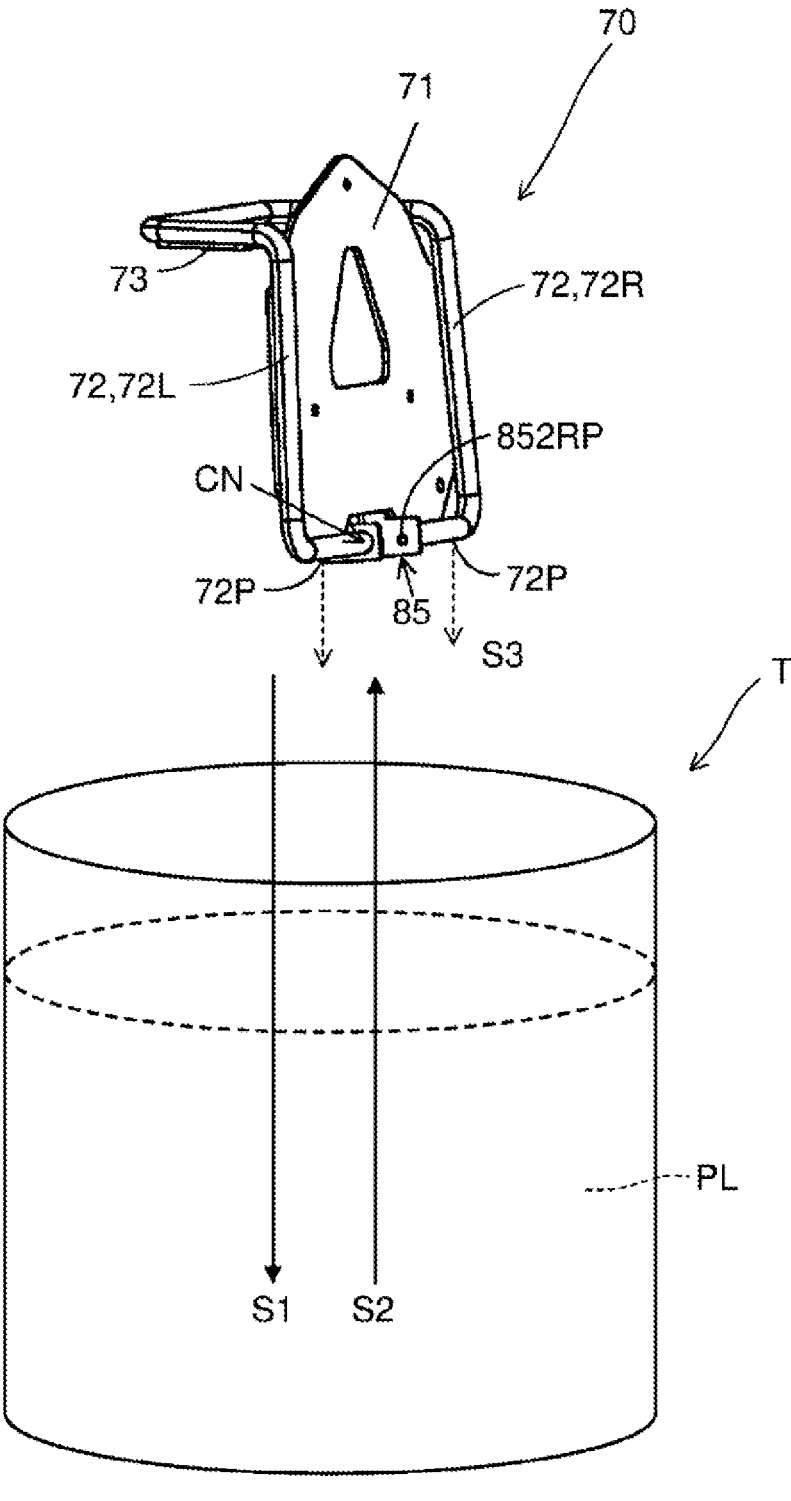
FIG. 22 schematically shows a process of painting a surface of the support unit.

FIG. 22 schematically shows the process of painting the surface of the support unit 70 described above. In the case of applying a paint to the surface of the support unit 70, the support unit 70, while being suspended by a crane (not shown), is moved above a tank T tanking a paint liquid PL (S1). Then, the support unit 70 is downed, to be immersed in the paint liquid PL (S2). After an elapse of a certain time, the support unit 70 is upped; and after the liquid has stopped sagging (S3), the support unit 70 is carried from above the tank T to a given position thereby to end the process.

In the configuration where the support plate 71, the protective pipe 72, the fixed plate 73, and the mount stay 85 are integrally connected by welding, not all parts are fully welded thereby to be connected, leaving a possibility of causing an incomplete welded part (part not connected). Thus, if, the incomplete welded part should be caused to the connection part CN connected with the protective pipe 72 in the mount stay 85, for example; the support unit 70, when being immersed in the paint liquid PL in the painting process, causes the paint liquid PL enters the inside of the protective pipe 72 from the incomplete welded part. The paint liquid PL having entered the inside of the protective pipe 72 causes corrosion to the inner face of the protective pipe 72, making it necessary to remove the paint liquid PL from the inside of the protective pipe 72.

In the example in FIG. 22, the support unit 70 is immersed in the paint liquid PL in a state where the support unit 70 is so suspended that the back side of the support unit 70 (mount stay 85 side) is down and the front side (fixed plate 73 side) is up. In view of the above, the side face hole part 72P is formed on the back end side of the protective pipe 72 in normal use, that is, when the support unit 70 is mounted to the ROPS frame 60. In other words, the side face hole part 72P, in the protective pipe 72, is formed on the side face that is downstream in the gravity direction seen when the support unit 70 is suspended as described above. As a result, even if the paint liquid PL, at the time of the painting process, should enter the inside of the protective pipe 72 from the incompletely welded part (for example, connection part CN) of the support unit 70, the paint liquid PL, after the support unit 70 being removed from the tank T, is removed down through the side face hole part 72P. Further, the paint liquid PL having entered the inside of the protective pipe 72, after the support unit 70 is ejected from the tank T, falls out of the left sidewall hole part 852LP or right sidewall hole part 852RP provided in the mount stay 85. This prevents the inner face of the protective pipe 72 from being corroded by the paint liquid PL.

Further, in the connection part CN, for example, even when rainwater or the like enters the protective pipe 72 from the incompletely welded part, the rainwater can be drained out via the side face hole part 72P, the left sidewall hole part 852LP, or the right sidewall hole part 852RP. Thus, the configuration of providing the side face hole part 72P, etc. leads to reduction of corroding and rusting, due to rainwater, of the inner face of the protective pipe 72.

Further, the side face hole part 72P's position in the protective pipe 72 is not limited to the back end of the protective pipe 72 in normal use. For example, the side face hole part 72P may be provided at the front part of the protective pipe 72 (for example, at the connection part connected with the fixed plate 73) or at the side part (at the connection part connected with the left edge 71L or right edge 71R of the support plate 71) during normal use.

6. Others

The first fixing member 81, which fixes part of the harness WH to the support unit 70 (in particular, support plate 71), may be provided on the upper face of the support plate 71 thereby to fix the harness WH, as shown in FIG. 4, or may be provided on the lower face of the support plate 71 thereby to fix the harness WH, as shown in FIG. 21.

7. Appendices

The tractor 1 described in the present embodiment can also be expressed as a work vehicle as shown in the following appendices.

A work vehicle of appendix (1) includes:
a vehicle body to which a work machine is connected at a back; and
a ROPS frame that, in the vehicle body, is erected in a back part of a drive seat,
wherein
the work vehicle further includes:
a positioning unit that, based on a signal sent from a positioning satellite, detects a position of the vehicle body, and
a support unit that is fixed to an upper part of the ROPS frame, and supports the positioning unit from below, and
the positioning unit has a harness connection part that is connected with a harness for sending information to outside,
the harness connection part is positioned in a back part of the positioning unit, and
the support unit is so positioned as to protrude behind the harness connection part of the positioning unit.

The work vehicle of appendix (2), in the work vehicle according to appendix (1), is such that
the harness connection part is so positioned as to protrude backward from a back face of the positioning unit.

The work vehicle of appendix (3), in the work vehicle according to appendix (1) or (2), is such that
the harness connection part is positioned behind the ROPS frame.

The work vehicle of appendix (4), in the work vehicle according to any of appendices (1) to (3), is such that
the support unit has:
a support member that supports the positioning unit, and a protective member that is mounted to the support member, and
the protective member is mounted to a back part of the support member and extends in a right/left direction.

The work vehicle of appendix (5), in the work vehicle according to appendix (4), is such that
the protective member has a shape that extends forward from each of right and left end parts of a back part of the support member along respective right and left edges of the support member, and that connects in front of the ROPS frame and in the right/left direction in a position below the support member.

The work vehicle of appendix (6), in the work vehicle according to any of appendices (1) to (5), further includes:
a first fixing member that, to the support unit, fixes part of the harness connected to the harness connection part.

The work vehicle as of appendix (7), in the work vehicle according to appendix (6), further includes:
a second fixing member that fixes the part of the harness to an outer surface of the ROPS frame.

The work vehicle of appendix (8), in the work vehicle according to any of appendices (1) to (3), is such that
the support unit has a support member that supports the positioning unit, and
the support member has a notch part below the harness connection part.

The work vehicle of appendix (9), in the work vehicle according to appendix (8), is such that
the support unit further has a mount stay that is depressed downward through an inside of the notch part, and is fixed to the support member.

The work vehicle of appendix (10), in the work vehicle according to appendix (9), is such that
the support unit further has a protective member that is mounted to a back part of the support member, and extends in a right/left direction, and
the mount stay and an end part of the protective member are connected (by welding).

The work vehicle of appendix (11), in the work vehicle according to appendix (10), is such that
the protective member is a hollow pipe, and
at least one of the protective member and the mount stay's connection part <CN> connected with the protective member has a hole part.

The work vehicle of appendix (12), in the work vehicle according to any of appendices (9) to (11), includes:
a fastening part <90> that fastens the mount stay to the ROPS frame.

The embodiment of the present invention has been described above, but the scope of the present invention is not limited thereto, and can be carried out within an extended or modified range without departing from the gist of the present invention.

INDUSTRIAL APPLICABILITY

The present invention can be used for a work vehicle such as tractor, for example.

REFERENCE SIGNS LIST

1 tractor (work vehicle)
2 vehicle body
7 drive seat
45 positioning satellite
50 antenna unit (positioning unit)
50B back face 51 harness connection part
60 ROPS frame
70 support unit
71 support plate (support member)
71*a* end part
71*b* end part
71B back part edge (back part)
71L left edge
71N notch part
71R right edge
72 protective pipe (protective member)
81 first fixing member
82 second fixing member
85 mount stay
100 work machine
WH harness

The invention claimed is:

1. A work vehicle comprising:
a vehicle body to which a work machine is connected at a back; and
a roll-over protection structure frame that, in the vehicle body, is erected in a back part of a drive seat,
wherein
the work vehicle further comprises:
a positioning unit that, based on a signal sent from a positioning satellite, detects a position of the vehicle body, and
a support unit that is fixed to an upper part of the roll-over protection structure frame, and supports the positioning unit from below, and
the positioning unit has a harness connection part that is connected with a harness for sending information to outside,
the harness connection part is positioned in a back part of the positioning unit, and
the support unit is so positioned as to protrude behind the harness connection part of the positioning unit.

2. The work vehicle as claimed in claim 1, wherein
the harness connection part is so positioned as to protrude backward from a back face of the positioning unit.

3. The work vehicle as claimed in claim 1, wherein
the harness connection part is positioned behind the roll-over protection structure frame.

4. The work vehicle as claimed in claim 1, wherein
the support unit has:
a support member that supports the positioning unit, and
a protective member mounted to the support member, and
the protective member is mounted to a back part of the support member and extends in a right/left direction.

5. The work vehicle as claimed in claim 4, wherein
the protective member has a shape that extends forward from each of right and left end parts of a back part of the support member along respective right and left edges of the support member, and that connects in front of the roll-over protection structure frame and in the right/left direction in a position below the support member.

6. The work vehicle as claimed in claim 1, further comprising:
a first fixing member that, to the support unit, fixes part of the harness connected to the harness connection part.

7. The work vehicle as claimed in claim 6, further comprising:
a second fixing member that fixes the part of the harness to an outer surface of the roll-over protection structure frame.

8. The work vehicle as claimed in claim 1, wherein
the support unit has a support member that supports the positioning unit, and
the support member has a notch part below the harness connection part.

9. The work vehicle as claimed in claim 8, wherein
the support unit further has a mount stay that is depressed downward through an inside of the notch part, and is fixed to the support member.

* * * * *